(12) United States Patent
Grisham

(10) Patent No.: US 6,452,532 B1
(45) Date of Patent: Sep. 17, 2002

(54) APPARATUS AND METHOD FOR MICROWAVE INTERFEROMETRY RADIATING INCREMENTALLY ACCUMULATING HOLOGRAPHY

(75) Inventor: William H. Grisham, Waveland, MS (US)

(73) Assignee: Rosae, Inc., Jackson, MS (US)

( * ) Notice: Subject to any disclaimer, the term of this patent is extended or adjusted under 35 U.S.C. 154(b) by 0 days.

(21) Appl. No.: 09/848,963

(22) Filed: May 4, 2001

Related U.S. Application Data
(60) Provisional application No. 60/201,814, filed on May 4, 2000.

(51) Int. Cl.[7] .............................................. G01S 13/00
(52) U.S. Cl. .......................................... 342/25; 342/191
(58) Field of Search .......................... 342/25, 156, 190, 342/191, 424

(56) References Cited

U.S. PATENT DOCUMENTS

| | | | |
|---|---|---|---|
| 3,243,706 A | | 3/1966 | Grisham ....................... 325/15 |
| 3,899,253 A | * | 8/1975 | Overhoff ..................... 356/108 |
| 4,325,065 A | | 4/1982 | Caputi, Jr. ...................... 343/5 |
| 4,602,257 A | | 7/1986 | Grisham ......................... 343/5 |
| 5,051,749 A | * | 9/1991 | Stoyle .......................... 342/25 |
| 5,708,443 A | * | 1/1998 | Rose ............................ 342/442 |
| 6,150,972 A | * | 11/2000 | Bickel et al. .................. 342/25 |
| 6,184,994 B1 | * | 2/2001 | Freischlad .................. 356/511 |

OTHER PUBLICATIONS

*Radar Handbook*, Merrill I. Skolnik, Editor in Chief, Naval Research Lab, McGraw–Hill (1970), Chapter 36, pp. 36–13 through 36–14.

*Bistatic Synthetic–Aperture Radar Imaging of Rotating Objects*, D. Mensa and G. Heidbreder (Jul. 1982) pp. 423 through 431.

Internet Website Publication, SARAH Technologies, Inc. (summer of 1998), 43 pages.

Aperture Synthesis by Object Rotation in Coherent Imaging, Dean Mensa et al., IEEE Transactions on Nuclear Science, vol. NS–27, No. 2 (Apr. 1980) pp. 989–998.

Jack L. Walker, Range–Doppler Imaging of Rotating Objects, IEEE Transactions on Aerospace and Electronic Systems, vol. AES–16, No. 1 (Jan. 1980) pp. 23–52.

* cited by examiner

Primary Examiner—Thomas H. Tarcza
Assistant Examiner—Brian Andrea
(74) Attorney, Agent, or Firm—Walker, McKenzie & Walker PC

(57) ABSTRACT

A satellite architecture and method for microwave interferometry radiating incrementally accumulating holography, used to create a high-gain, narrow-bandwidth actively-illuminated interferometric bistatic SAR whose VLBI has a baseline between its two bistatic apertures, each on a different satellite, that is considerably longer than the FOV, in contrast to prior art bistatic SAR where the interferometer baseline is shorter than the FOV. Three, six, and twelve satellite configurations are formed of VLA satellite VLBI triads, each satellite of the triad being in its own nominally circular orbit in an orbital plane mutually orthogonal to the others of the triad. VLBI pairs are formed by pairwise groupings of satellites in each VLA triad, with the third satellite being used as a control satellite to receive both Michelson interferometric data for phase closure and Fizeau interferometric imaging data that is recorded on a holographic disc, preserving phase.

12 Claims, 11 Drawing Sheets

MAGNITUDE OF VLBI VECTOR

MAGNITUDE OF VLBI PHASE CENTERLINE VECTOR

BISTATIC RANGE MAG.

ILLUMINATION TIME

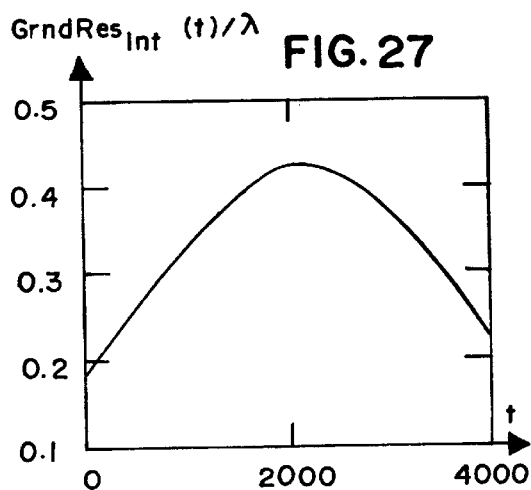
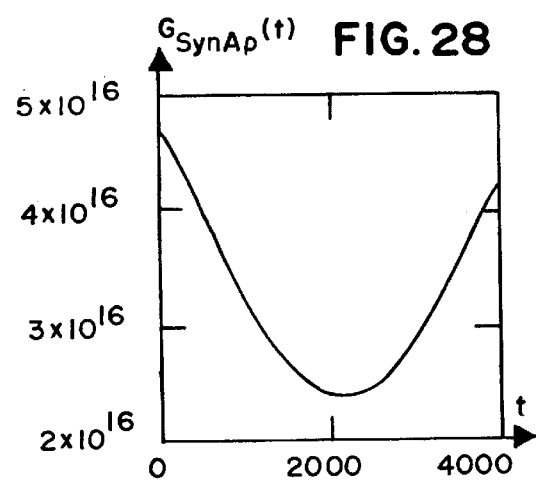
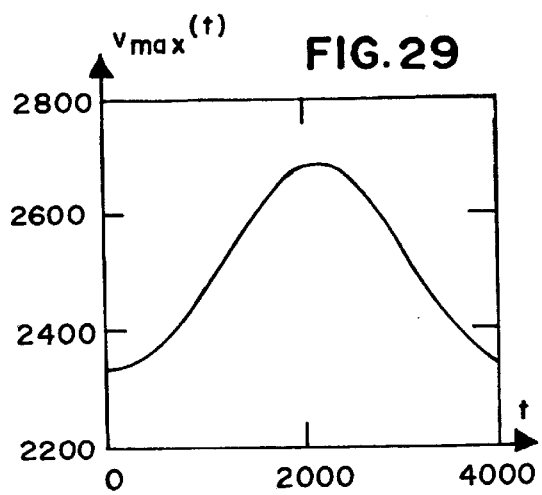
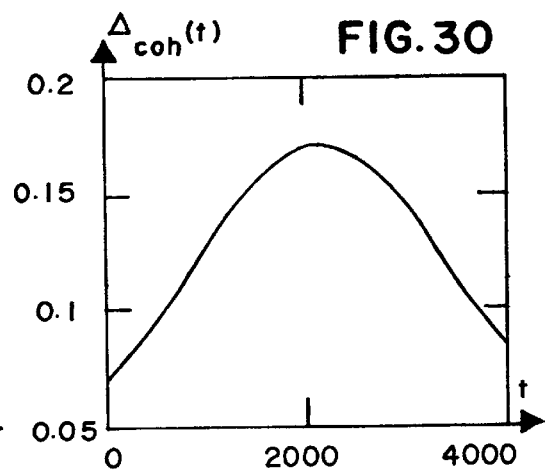
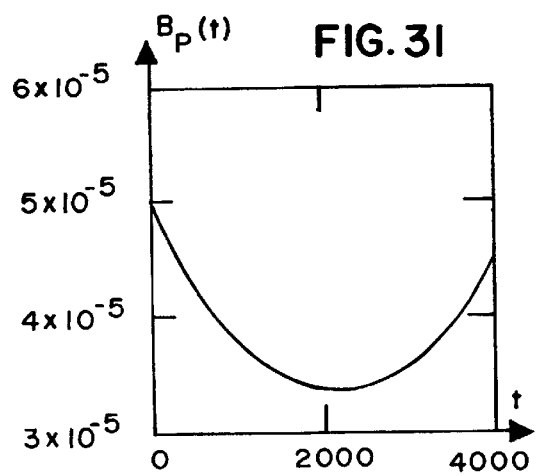
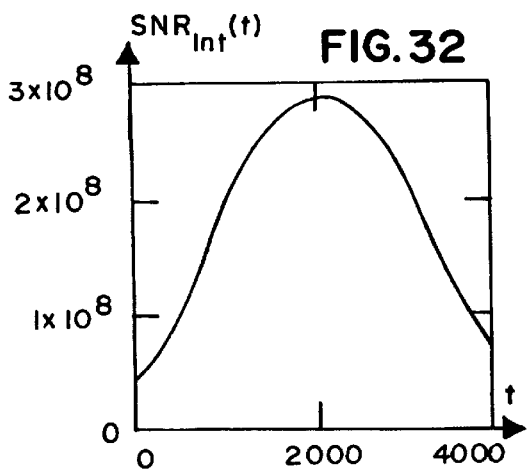

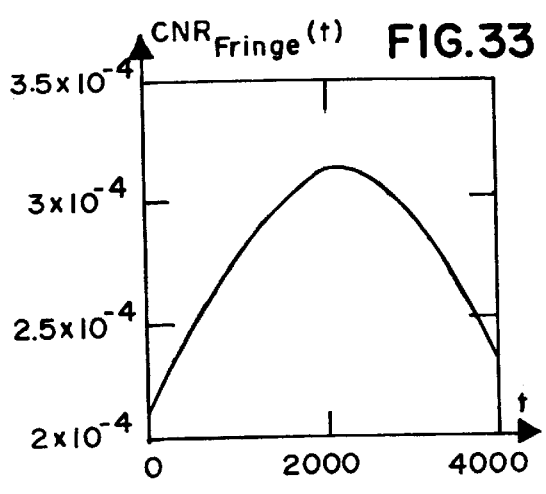
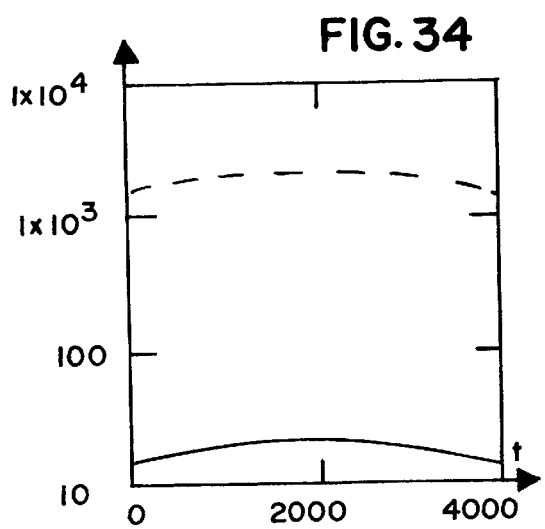
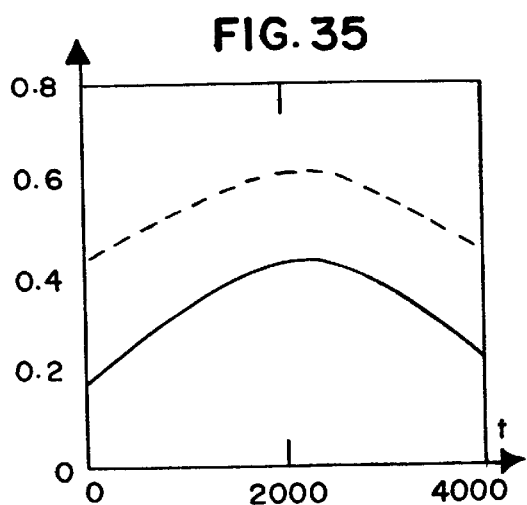
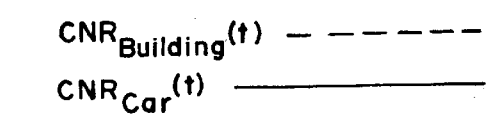
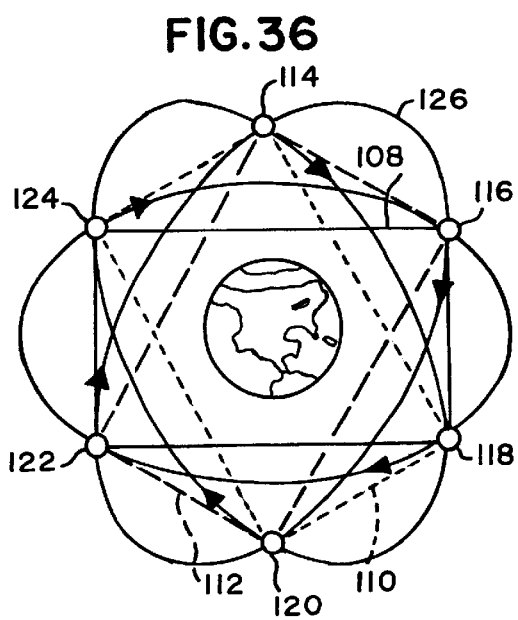
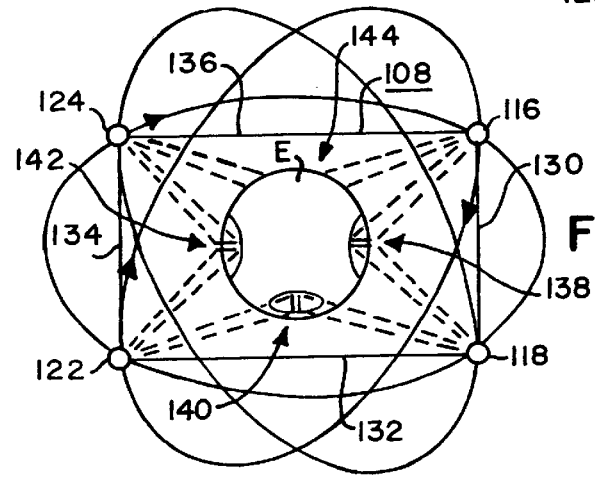

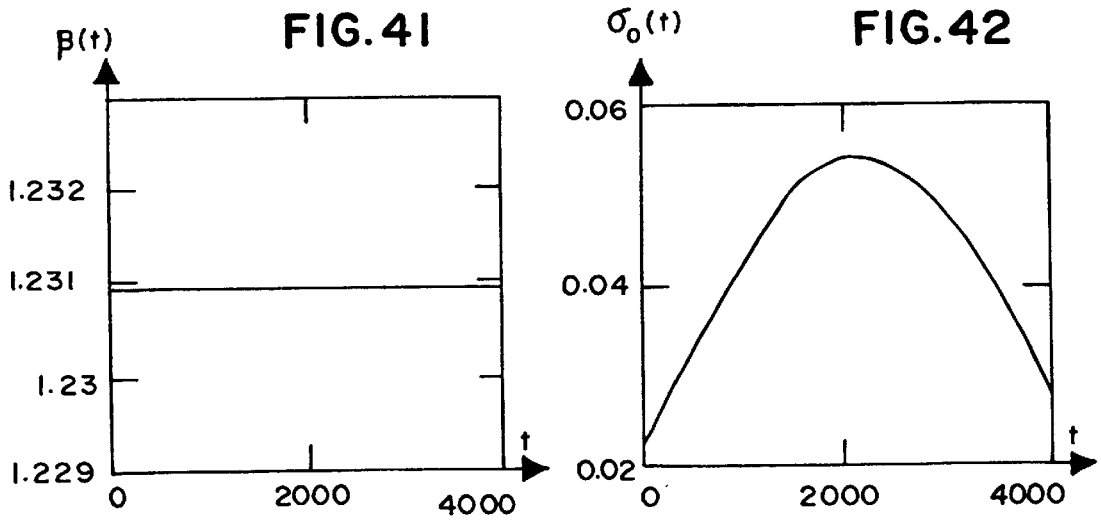
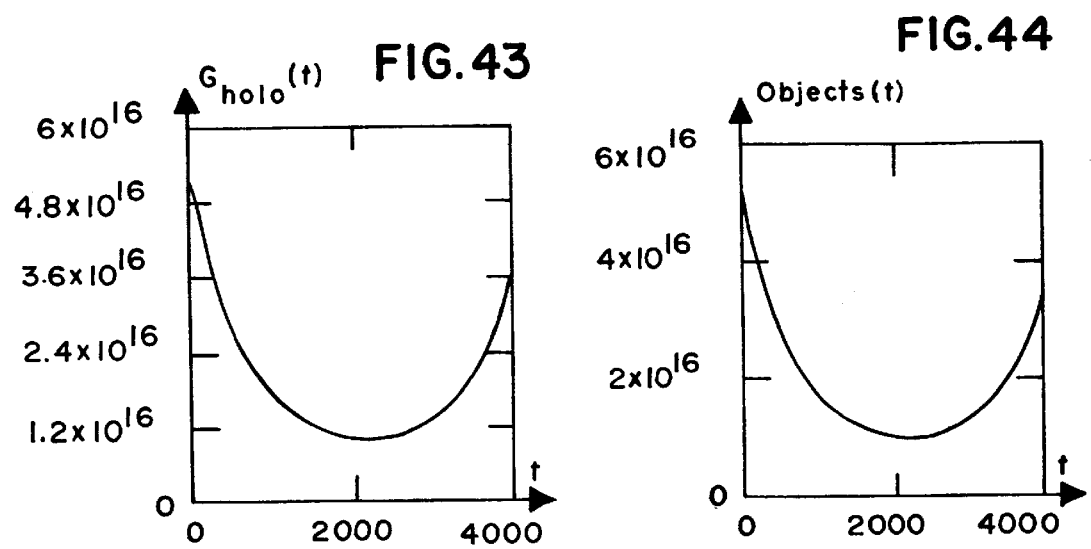
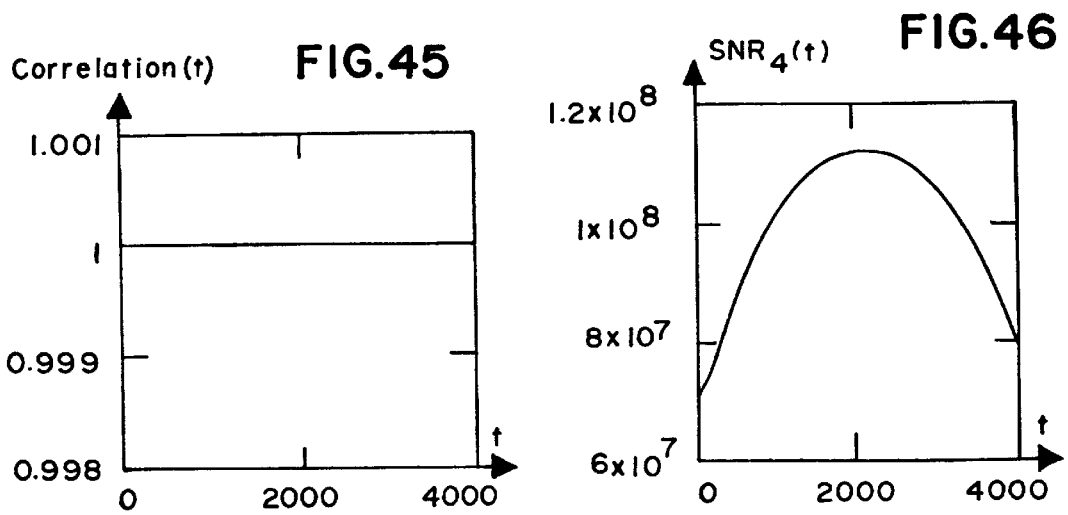

APPARATUS AND METHOD FOR MICROWAVE INTERFEROMETRY RADIATING INCREMENTALLY ACCUMULATING HOLOGRAPHY

CROSS REFERENCE TO RELATED APPLICATIONS

This application is a non-provisional application corresponding to pending U.S. Provisional Patent Application No. 60/201,814, filed May 4, 2000, and claims priority thereof.

STATEMENT REGARDING FEDERALLY SPONSORED RESEARCH OR DEVELOPMENT

Not applicable.

REFERENCE TO COMPACT DISC(S)

Not applicable.

BACKGROUND OF THE INVENTION

1. Field of the Invention

The present invention relates, in general, to radar imaging methods, and in particular, to apparatus and methods for operating satellites utilizing radar and holography for imaging an orbited planet. The method of the present invention is also applicable for use in non-satellite imaging applications such as medical imaging.

2. Information Disclosure Statement

It is often desired to image a planet's surface and subsurface with high resolution in near real time. Well-known solutions for this problem include Synthetic Aperture Radar ("SAR") using microwave imaging. Known satellite SAR focus a "flat earth" field of view ("FOV") to a flat physical receiving antenna. Additionally, they cycle their complex imaging received signal at the rate in which the Doppler history (phase) on the physical aperture (the antenna) "fills", i.e., when the finest phase replica is first present on the face of the antenna. At this time, known SAR convert from analog to digital (A/D) while simultaneously detecting phase, and then digitally focus and truncate series expressions of the "flat earth" geometry, in order to linearize and orthogonalize the imagery set, thereby inserting accumulating bias errors.

Unlike Doppler, which is coherent, Range is not coherent. Additionally, because prior art SAR technology uses Range for the second dimension, which is the "weak link" in its technology (limiting the finest resolution and causing the largest burden of noise), prior art SAR necessarily uses extremely wide bandwidth and is the principal cause of excessive RF power requirements at the satellite. RF propagation losses and realistic antenna beam widths force the wide bandwidth prior art SAR satellite to be limited to use at low altitudes causing associated infrequent revisit intervals, and "store and forward" imaging data is thereby forced to be downlinked at infrequent intervals, overloading the downlink capacity and limiting the overall effectiveness of prior art SAR technology. Prior art SAR technology also has very small swath widths that necessarily limit the number of available imaged areas, making prior art SAR technology unacceptable for use as a commercial service.

Known prior art interferometric imaging technology necessarily focuses outward into space because the mensurational accuracy required is too demanding for downward looking, earth oriented, fine resolution imaging using known prior art technology.

It is therefore desirable to have an improved satellite imaging system that does not have these problems found in the prior art. It would be desirable to have an improved satellite imaging system that has substantially improved gain and signal-to-noise ratio as compared to the prior art, and that further has a wide FOV swath and whose image reconstruction is decoupled from a dependence on time. It is further desirable to have an improved satellite imaging system with substantially better phase closure accuracy than heretofore possible.

Grisham, U.S. Pat. No. 3,243,706 (issued Mar. 29, 1966; hereinafter, the "ROSAE patent"), describes a satellite system having three subsystems of two pair of satellites each, and the orbits of all satellites within each subsystem are nominally circular. In one subsystem, the two pair of satellites orbit circularly in an equatorial plane. The other two subsystems have polar planes of circular orbit, with the polar planes being orthogonal to each other and also being orthogonal to the equatorial plane subsystem so that the planes of all three subsystems are mutually perpendicular. Within each subsystem, the two members of one pair of satellites are nominally 180° apart and orbit in one sense (direction), while the two members of the other pair of satellites are nominally 180° apart but orbit in the other sense (direction). While the satellite configuration of the ROSAE patent is a preferable configuration for use by the present invention, the ROSAE patent does not disclose or suggest using the microwave interferometry radiating incrementally accumulating holography ("MIRIAH") method of the present invention in combination with the satellite configuration of the ROSAE patent.

Caputi, U.S. Pat. No. 4,325,065 (issued Apr. 13, 1982), describes a process for correcting data from a bistatic synthetic aperture radar ("SAR") to eliminate distortions and resolution limitations due to the relative positions and motions of the radar transmitter and receiver with respect to a target.

Grisham, U.S. Pat. No. 4,602,257 (issued Jul. 22, 1986; hereinafter the "SARAH patent") and fully incorporated herein by reference, describes a method of satellite operation utilizing a paired-satellite configuration in which one satellite illuminates the imaged field of view and the other satellite receives the reflected energy using bistatic synthetic aperture radar ("SAR"), but did not teach or suggest the use of interferometers for illumination or holography for recording the image data, and thus did not generate a large positive Gain spatial matched filter in a Fourier plane (i.e., a hologram). Instead, the SARAH patent taught use of Range/Doppler for illumination, and generated a time dependent matched filter in the Fourier plane. Because both SAR and SARAH use time referencing, image reconstruction by these prior art methods is necessarily dependent on time.

None of the known prior art references, either singly or in combination, disclose or suggest the present invention.

BRIEF SUMMARY OF THE INVENTION

The present invention is a satellite architecture used to create a narrow-bandwidth actively-illuminated interferometric Synthetic Aperture Radar ("SAR"), specifically, a bistatic SAR, whose Very Long Baseline Interferometer ("VLBI") has a baseline between its two bistatic apertures, each on a different satellite, that is considerably longer than the diameter of the field of view ("FOV"). This is in contrast to prior art bistatic SAR where the interferometer baseline is shorter than the diameter of the FOV because both bistatic apertures were on the same satellite. The preferred embodiments of the invention use subsets of the satellite orbit configuration as described in Grisham, U.S. Pat. No. 3,243,706 (issued Mar. 29, 1966; hereinafter, the "ROSAE patent") and fully incorporated herein by reference, whose satellite orbit structure is shown in FIG. 1.

Each of the preferred embodiments of the present invention has one or more VLBI created by pairs of satellites. The most preferred embodiments, having symmetrical configurations of three, six, and twelve satellites, are built on a foundation of Very Large Array ("VLA") satellite VLBI triads, with each satellite of the triad being in its own nominally circular orbit, with the orbital planes of the three satellites of the triad being mutually orthogonal, and with the orbital angular velocity of each satellite preferably being five times the angular rotational velocity of the earth. For each VLA triad of satellites, VLBI pairs are formed by pairwise grouping of the satellites in the VLA, with the third satellite of the VLA being used as a control satellite to receive Michelson interferometric data from the VLBI pair to maintain phase closure, and also to receive Fizeau interferometric imaging data from the VLBI pair to be recorded in the Fourier plane of a holographic disc.

In contrast to prior art SAR technology, in which the synthetic aperture is time referenced, the present invention extends the synthetic aperture in size and in a second dimension and uses active illumination of the FOV by interferometers, thereby causing the resulting synthetic aperture to become spatially referenced. In terms of matched filter theory, the present invention's microwave interferometry radiating incrementally accumulating holography ("MIRIAH") technology provides a two-dimensional spatial matched filter with an extraordinarily narrow passband (for finer resolution and higher gain than heretofore possible). Like all interferometers, the interferometers of the present invention are self-referencing, i.e., referenced as a function of their spatial position, with resolution improving as the length (and frequency) of the interferometer increases. Accordingly, the coherent gain produced by the method and apparatus of the present invention not only increases with the size (VLBI length) of its synthetic aperture, but the gain coefficient of the present invention is also squared, as compared with the gain coefficient of prior art SAR technology, because the present invention "fully fills" a two-dimensional synthetic aperture by "fully filling" a two-dimensional spatial matched filter (hologram).

A "Master" Stable Oscillator ("STALO") or clock is preferably used to slave the STALO of every other satellite throughout the architecture of the present invention. In this way, in the preferred embodiments, each set of three VLBI, arranged as an equilateral triad, act in concert as a single coherent VLA. A preferred three-satellite configuration ("MIRIAH*3") has one such VLA triad of VLBI. A preferred six-satellite configuration ("MIRIAH*6") has eight such VLA triads of VLBI, each rotating in one sense. A preferred twelve-satellite configuration ("MIRIAH* 12"), using the satellite orbital configuration of the ROSAE patent, has sixteen such VLA triads of VLBI with eight VLA triads rotating in one sense and with the remaining eight VLA triads rotating in the other sense.

For the example parametric values used in the conceptual parametric analysis presented hereinafter in the detailed description of the preferred embodiments, the minimum bandwidth $B_{CohInt}$, corresponding to the total coherence time of one Sidereal Day (86,164 seconds) of the spatial matched filter (hologram) is shown to be about $3.646 \times 10^{-5}$ Hz, which rejects the bistatic Doppler shift signal while passing the interferogram data. The minimum deviation between the interferogram diffraction lines at the at the edge of each zone plate in the Fourier plane is shown to shrink with coherence time, thereby creating Zone Plates (Fresnel lens in the Fourier plane) that are concentric about each pixel in the image plane. Accordingly, the matched filter is actually a hologram comprised of a collage of millions of these Fresnel lenses, wherein the deviation distance between the outer fringes of these Fresnel lenses sets the resolution, and the Gain is set by the ratio of the Fresnel lens area to the pixel area. Even though the VLA is a synthetic aperture, this resulting gain is shown to be the same as that derived by computing the Gain of the VLA as a real aperture.

The conceptual parametric analysis shows that the coherent Gain for the VLA triads is computed in the usual way, as for real apertures, with the "swept" area, $A_{VLA}$, of the VLA (i.e., the synthetic aperture area "filled" during the coherence time $T_{coh}$) being given by $$A_{VLA}(t) = \pi \cdot \left(\frac{c(t)}{2\cos(\frac{\pi}{6})}\right)^2$$

where c(t), shown in FIG. 39, is the magnitude (length) of the VLBI vector C(t) as shown in FIG. 38, such that the two-dimensional Synthetic Aperture Gain, $G_{SynAp}(t)$, of the VLA is then given by the well-known formula $$G_{SynAp}(t) = \frac{4\pi \cdot A_{VLA}(t) \cdot \eta}{\lambda^2}$$

and as shown graphically in FIG. 28, where $\lambda$ is the wavelength and $\eta$ is the antenna efficiency. For the typical test case values used for purposes of evaluating the conceptual parametric analysis, it should be noted that this gain for the present invention is enormous, being on the order of $10^{16}$, which will be understood to be an extraordinary improvement over the prior art.

As shown in FIGS. 3 and 4, for each VLBI created by a satellite pair A-B of a VLA triad, there is a "control" satellite C of the VLA triad, not to be confused with the "Master" satellite that provides the master STALO clock to which all satellites in the architecture are slaved, with each "control" satellite being substantially along the VLBI phase centerline and equidistant from the other two satellites of the VLA. It shall be understood that each VLA triad has three VLBI, one for each satellite pair of the VLA triad, so that the role of "control" satellite is occupied by each satellite of the VLA, respectively for the VLBI on whose phase centerline the satellite sits. Using the MIRIAH*6 configuration shown in FIG. 2 as an example, there will be the need for 24 "control" satellites for the eight VLA triads shown, but only one "Master" satellite. Note that, for the MIRIAH*6 configuration, each satellite serves as a "control" satellite for each of the four VLA triads of which it is a member, such that the six satellites of the MIRIAH*6 architecture, each serving the "control" satellite role for each of the four VLA triads of which it is a member, together serve the required 24 "control" satellite roles. It will be understood that this architecture extends naturally to the MIRIAH*12 and MIRIAH*3 configurations, in a manner that will now be apparent to those skilled in the art.

The functional block diagram systems architecture of each VLBI is shown in FIG. 18. As described more fully in the detailed description of the preferred embodiments, in contrast to prior art SAR technology, phase coherence of the imaging data is preserved by the present invention up to the Fourier plane. Additionally, and also in contrast to the prior art, the second Power-Aperture, namely; the optical laser "read" of the previously-written hologram, need not be either phase locked to the STALO, or even of the same frequency used to "write" the hologram, because phase information is preserved as a diffraction pattern in the Fourier plane of the hologram during the extended "write" of the hologram. If a different frequency is used in illuminating the hologram during the "read" transformation to the image plane, it will be understood that the focal point will shift, the scale will change, and the SNR will then become a squared function of the two frequency ratios. However, the extraordinary Gain, SNR, and energy density improvements of the present invention will be maintained.

The present invention is a satellite architecture that is primarily designed for near real-time, day or night, all weather, fine resolution imaging of the earth's surface and subsurface. Secondarily, this invention will enable earth crust stress imaging, prediction of earthquakes and volcano episodes, and imaging of moving objects such as aircraft, trucks, etc. In addition to applications such as imaging of the earth, the methods of the present invention can also be used for penetration imaging of human and animal bodies for medical applications. The invention is designed to have the ideal attributes needed to provide a global, profitable, commercial imaging service that can provide fresh updates, day or night, in all weather, penetrating foliage and other obscurants including permeable soils. The microwave imagery will have high contrast and fine resolution, will be accessible globally on an open-demand basis, and will be hyperspectral (in numerous separate channels) and diverse in polarity. The architecture of the present invention permits much larger Fields of View ("FOV") than heretofore possible thereby ensuring an adequate supply of imagery data.

BRIEF DESCRIPTION OF THE SEVERAL VIEWS OF THE DRAWING

FIG. 27 is a graph of $GrndRes_{Int}(t)/\lambda$, the (unitless) ground resolution as a fraction of wavelength, of the VLBI interferometer in the field of view versus orbit time t (in seconds), for a satellite VLBI of the present invention.

FIG. 28 is a graph of the (unitless) synthetic aperture gain $G_{SynAp}(t)$ versus orbit time t (in seconds), for a satellite VLBI of the present invention.

FIG. 29 is a graph of the magnitude of the maximum velocity at the edge of the FOV, $v_{max}(t)$, versus orbit time t (in seconds), for a satellite VLBI of the present invention.

FIG. 30 is a graph of the magnitude of the overlaid count deviation intervals $\Delta_{coh}(t)$ of the hologram zone plate (in meters) versus orbit time t (in seconds), for a three-satellite ("MIRIAH*3") VLA of the present invention.

FIG. 31 is a graph of $B_P(t)$, the bandwidth (in Hz) versus orbit time t (in seconds) for a satellite VLBI of the present invention.

FIG. 32 is a graph of the (unitless) signal-to-noise ratio $SNR_{Int}(t)$, by an interferometric imaging analysis, versus orbit time t (in seconds), for a three-satellite ("MIRIAH*3") VLA of the present invention.

FIG. 33 is a graph of the (unitless) contrast ratio $CNR_{Fringe}(t)$ of the fringes of the holographic image versus orbit time t (in seconds), for a typical resolved target having a reflectivity $\sigma_o(t)$ as graphed in FIG. 42.

FIG. 34 is a graph of the (unitless) contrast ratio $CNR_{Building}(t)$ for typical buildings and of the (unitless) contrast ratio $CNR_{Car}(t)$ for typical cars versus orbit time t (in seconds), for a satellite VLBI of the present invention.

FIG. 35 is a graph of the fringe interval as a fraction of wavelength $d_{fringe,per\lambda}(t)$ at ground level of the field of view, and also of $GrndRes_{Int}(t)/\lambda$, the (unitless) ground resolution as a fraction of wavelength, of the VLBI interferometer in the field of view, both versus orbit time t (in seconds), for a satellite VLBI of the present invention.

FIG. 36 shows three different four-satellite ("MIRIAH*4") imaging configurations.

FIG. 37 shows the four fields of view for the four VLBI of the four-satellite imaging configuration ("MIRIAH*4") of the alternate embodiment method of the present invention.

FIG. 41 is a graph of the angle $\beta(t)$ (in radians), between the isometric planes normal to the angular velocity vectors $\omega_c(t)$ and $\omega_p(t)$, versus orbit time t (in seconds), for a satellite VLBI of the present invention.

FIG. 42 is a graph of $\sigma_o(t)$, the (unitless) normalized radar cross-section ("RCS") for an average rural scene assumed to be in the optical region, versus orbit time t (in seconds), for a satellite VLBI of the present invention.

FIG. 43 is a graph of the (unitless) two-dimensional holographic gain $G_{holo}(t)$ versus orbit time t (in seconds), for a satellite VLA of the present invention.

FIG. 44 is a graph of Objects(t), the (unitless) number of ground-resolved object areas in the field of view, versus orbit time t (in seconds), for a satellite VLA of the present invention.

FIG. 45 is a graph of Correlation(t), the (unitless) correlation between the two-dimensional holographic gain, $G_{holo}(t)$, and the number of ground-resolved object areas in the field of view, Objects(t), versus orbit time t (in seconds), for a satellite VLA of the present invention.

FIG. 46 is a graph of the (unitless) signal-to-noise ratio $SNR_4(t)$ in the holographic image plane versus orbit time t (in seconds), for a satellite VLA of the present invention.

DETAILED DESCRIPTION OF THE INVENTION

Referring to the figures accompanying this specification, the methods and apparatus of the preferred embodiments of the present invention can now be explained in detail. While the insights, methods, and variations of the apparatus of the present invention can also be used for non-satellite imaging applications, such as, for example, medical imaging applications, the spectacular advantages of the present invention, and its dramatic improvement over the prior art, are due to the extremely long distances provided between orbiting satellites, thereby allowing the construction and use of Very Long Baseline Interferometers ("VLBI") that span the distance between the orbiting satellites. It shall be understood that the methods and apparatus of the present invention are equally applicable for viewing the surface of any planet, but the planet earth will be used for purposes of illustration in the description of the preferred embodiments of the present invention.

It shall be understood that the method and apparatus of the present invention are useful throughout the electromagnetic spectrum, and the term "microwave" is used herein strictly for illustrative purposes as a preferred portion of the electromagnetic spectrum within which the present invention may operate. Likewise, while it will be understood that, strictly speaking, the present invention is not a "radar" system, many of the formulae and analytic methods used in radar imaging are equally applicable with the present invention and so, for purposes of clarity, much of the terminology used in radar technology is used for explanation and purposes of analysis herein.

First the satellite orbit configurations of the present invention will be described, and then the VLA and VLBI structure of the present invention will be described.

Figure 1:
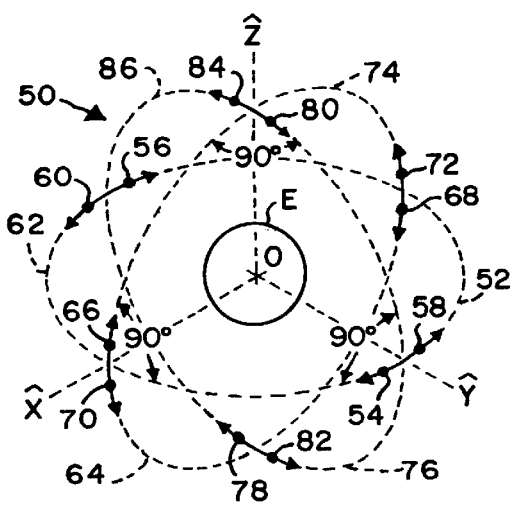
FIG. 1 is a diagrammatic view of a prior art twelve-satellite imaging configuration as disclosed in Grisham, U.S. Pat. No. 3,243,706 (issued Mar. 29, 1966; hereinafter, the "ROSAE patent").

The preferred embodiments of the invention use subsets of the satellite orbit configuration as described in Grisham, U.S. Pat. No. 3,243,706 (issued Mar. 29, 1966; hereinafter, the "ROSAE patent") and fully incorporated herein by reference, whose satellite orbit structure is shown in FIG. 1. In the full twelve-satellite configuration ("MIRIAH*12") of the present invention, the twelve-satellite orbit structure taught by the ROSAE patent is used as a foundation for the microwave interferometry radiating incrementally accumulating holography ("MIRIAH") technology of the present invention, as hereinafter described in detail. It shall be understood, as used herein, that the term ROSAE refers to twelve-satellite orbit structure 50 shown in FIG. 1, whereas the term MIRIAH, when referring to a satellite configuration, is used to denote the combination of the VLBI technology of the present invention being used together with a specific satellite configuration, such as a subset of the ROSAE configuration or the full twelve satellite ROSAE orbit configuration 50.

The twelve-satellite ROSAE orbit structure 50 is a satellite system having three subsystems of two pair of satellites each, and the orbits of all satellites within each subsystem are nominally circular. In one subsystem, the two pair of satellites orbit circularly in an equatorial plane. The other two subsystems have polar planes of circular orbit, with the polar planes being orthogonal to each other and also being orthogonal to the equatorial plane subsystem so that the planes of all three subsystems are mutually perpendicular. Within each subsystem, the two members of one pair of satellites are 180° apart and orbit in one sense (direction), while the two members of the other pair of satellites are 180° apart but orbit in the other sense (direction).

More specifically, using an xyz Cartesian co-ordinate system having an origin 0 at the center of the earth E and an arbitrary rotational orientation about the polar z axis, the first subsystem 52 comprises a first, a second, a third, and a fourth satellite, 54, 56, 58, 60 all orbiting in a first nominally circular orbit 62 within a first substantially orbital xy plane that is preferably generally equatorial about the earth E; said first and said second satellites 54, 56 being a first orbital pair and said third and said fourth satellites 58, 60 being a second orbital pair.

Similarly, the second subsystem 64 comprises a fifth, a sixth, a seventh, and an eighth satellite 66, 68, 70, 72 all orbiting in a second nominally circular orbit 74 within a second substantially polar orbital xz plane; said fifth and said sixth satellites 66, 68 being a third orbital pair and said seventh and said eighth satellites 70, 72 being a fourth orbital pair.

Similarly, the third subsystem 76 comprises a ninth, a tenth, an eleventh, and a twelfth satellite 78, 80, 82, 84 all orbiting in a third nominally circular orbit 86 within a third substantially polar orbital yz plane; said ninth and said tenth satellites 78, 80 being a fifth orbital pair and said eleventh and said twelfth satellites 82, 84 being a sixth orbital pair.

All of the twelve satellites shown in FIG. 1 preferably have substantially equal orbital angular velocities of approximately five times the angular rotational velocity of the earth, and the satellites within each orbital pair are separated from each other by substantially 180° of central angle, and the two orbital pairs of each orbital plane are seen to have opposite senses of rotation. Satellites within a given subsystem rotating in opposite sense "meet" (have a point of closest approach) at opposite sides of the celestial sphere once every 90° of central angle travel, assuming nominal spacing. The system of satellites is preferably synchronized so as to assure that "meetings" occur at approximately 0° or 90° of latitude on the celestial sphere, and are further phased so that, when one polar subsystem is "meeting" at the celestial poles, the other polar subsystem is "meeting" at the celestial equator. FIG. 1 shows the locations of the twelve satellites shortly after such a "meeting".

Figure 2:
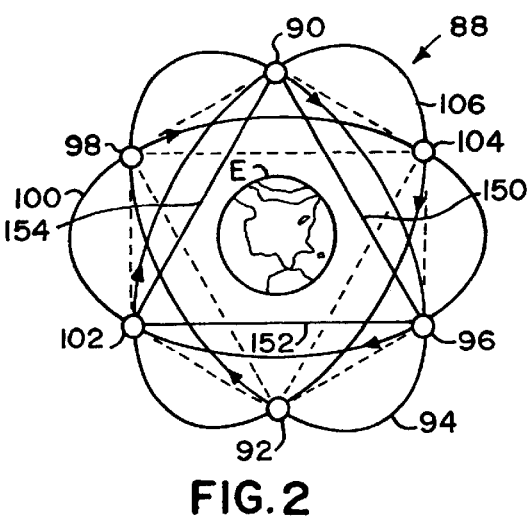
FIG. 2 is a diagrammatic view of a six-satellite imaging configuration ("MIRIAH*6") using the method of the present invention.

The six-satellite configuration "MIRIAH*6" is shown in FIG. 2, and this satellite configuration 88 is simply one rotational sense of the ROSAE system. Alternatively and equivalently, it will be understood that the MIRIAH*12 configuration is simply two rotational senses of the MIRIAH*6 configuration 88.

By analogy with the full ROSAE configuration, the MIRIAH*6 configuration 88 has a first and a second satellite 90, 92 orbiting in a first nominally circular orbit 94 within a first substantially orbital plane; a third and a fourth satellite 96, 98 orbiting in a second nominally circular orbit 100 within a second substantially orbital plane; and a fifth and a sixth satellite 102, 104 orbiting in a third nominally circular orbit 106 within a third substantially orbital plane. As with the ROSAE configuration, the first, second, and third orbital planes are substantially mutually orthogonal, and all of the satellites have substantially equal orbital angular velocities, again preferably five times the angular velocity of the earth; and both satellites within each orbital plane are separated from each other by substantially 180° of central angle.

Figure 6:
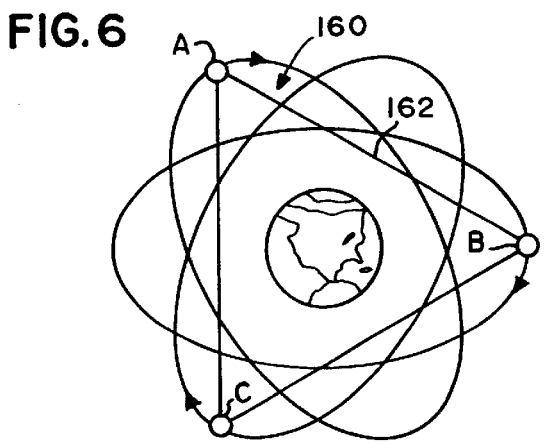
FIGS. 6–12 are time-sequenced diagrammatic views of a VLBI triad of the present invention, showing the rotation and migration of the VLBI triad as the satellites mutually orbit the planet.
Figure 7:
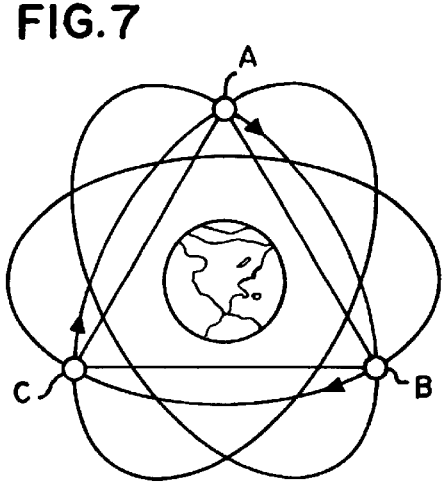
Figure 8:
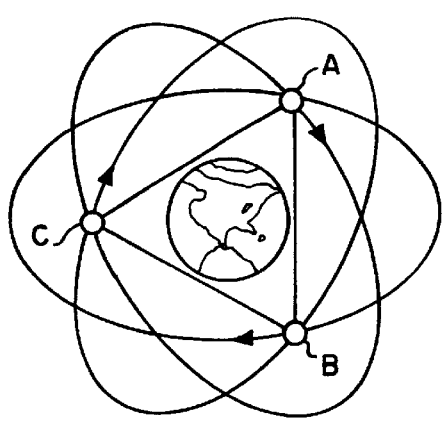
Figure 9:
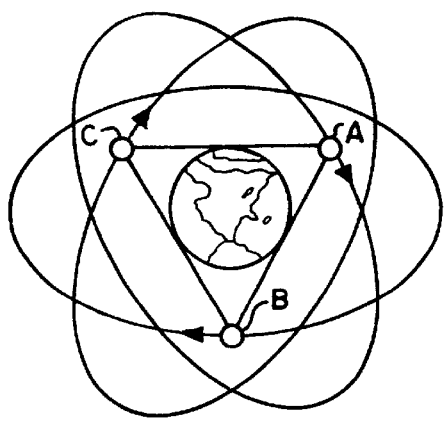
Figure 10:
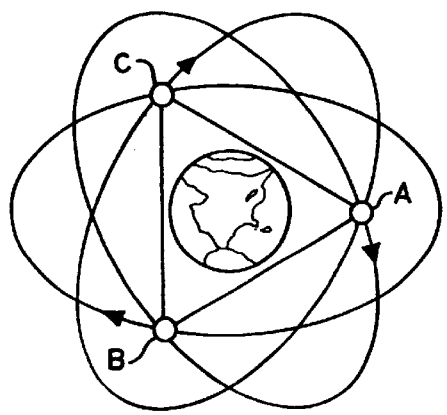
Figure 11:
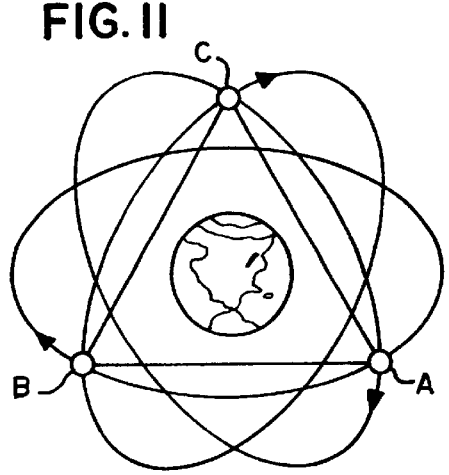
Figure 12:
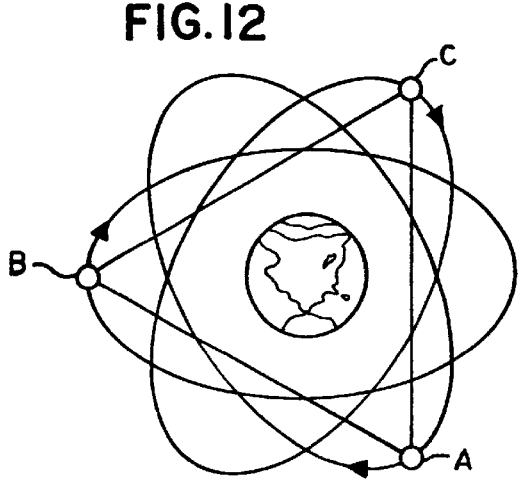

The three-satellite configuration "MIRIAH*3" can also be seen in FIG. 6, and this satellite configuration is simply one satellite from each orbit of the MIRIAH*6 configuration. Alternatively and equivalently, it will be understood that the MIRIAH*6 configuration 88 is simply two instances of the MIRIAH*3 configuration in which the satellites of each orbit rotate in the same sense and are separated by 180° of central angle.

By analogy with the MIRIAH*6 configuration, the MIRIAH*3 configuration has a first, a second, and a third satellite, such as satellites 90, 96, and 102 orbiting respectively in first, second, and third nominally circular orbits 94, 100, 106 respectively within first, second, and third substantially orbital planes. As with the MIRIAH*6 configuration, the first, second, and third orbital planes are substantially mutually orthogonal, and all of the satellites have substantially equal orbital angular velocities, again preferably five times the angular velocity of the earth.

There is also a minimal two-satellite MIRIAH*2 configuration, which is simply any two of the three satellites of a MIRIAH*3 configuration. A MIRIAH*2 configuration is less desirable than any of the other configurations of the present invention because it does not have the advantage, as hereinafter discussed in detail, of having a third satellite located on the phase centerline of the VLBI formed by the pair of satellites in the MIRIAH*2 configuration. However, the MIRIAH*2 configuration has the advantage of only requiring smaller and fewer launch vehicles, and can be, used to do a "proof of concept" evaluation of the present invention even though it cannot have the superior phase closure properties of the VLA satellite triads upon which MIRIAH*3, MIRIAH*6, and MIRIAH*12 are built.

By analogy with the MIRIAH*3 configuration, the MIRIAH*2 configuration has a first and a second satellite, such as satellites 90, 96 orbiting respectively in first and second nominally circular orbits 94, 100 respectively within first and second orbital planes. As with the MIRIAH*3 configuration, the first and second orbital planes are substantially mutually orthogonal, and all of the satellites have substantially equal orbital angular velocities, again preferably five times the angular velocity of the earth.

There is additionally a four-satellite MIRIAH*4 configuration, three of which, 108, 110, and 112, are shown in FIG. 36. Satellites 116, 118, 122, and 124 comprise MIRIAH*4 quad 108; satellites 114, 118, 120, and 124 comprise MIRIAH*4 quad 110; and satellites 114, 116, 120, and 122 comprise MIRIAH*4 quad 112. These three MIRIAH*4 quads are also present in FIG. 2, but are somewhat harder to see, so it shall be understood that not only may a MIRIAH*4 quad be constructed by itself, there are inherently three MIRIAH*4 quads as a part of every MIRIAH*6 configuration and, by extension, there are likewise six MIRIAH*4 quads as a part of every MIRIAH*12 configuration, three of which rotate in one sense and three of which rotate in the opposite sense.

Each MIRIAH*4 satellite quad architecture, such as quad 108, has a first and a second satellite, such as 116, 122, orbiting in a first nominally circular orbit, such as orbit 126, within a first substantially orbital plane, and a third and a fourth satellite, such as 118, 124, orbiting in a second nominally circular orbit, such as orbit 128, within a second substantially orbital plane. As with the MIRIAH*6 configuration, the first and second orbital planes are substantially mutually orthogonal, and all of the satellites have substantially equal orbital angular velocities, again preferably five times the angular velocity of the earth. Both satellites within each orbital plane are separated from each other by substantially 180° of central angle.

Now that the satellite configurations have been described, the VLA and VLBI configurations can be described, with reference especially to FIGS. 1–18. It shall be understood that there are many similarities between all of the MIRIAH configurations, and only those differences specific to each configuration will be discussed in detail, once the common points have been discussed.

Referring to FIG. 2, the MIRIAH*6 configuration is comprised of eight Very Large Array ("VLA"), each VLA being a triad of three satellites in an equilateral triangle geometry, each VLA also have three Very Long Baseline Interferometers ("VLBI"), one on each side of the triangle, i.e., one between each pair of satellites of the VLA triad.

The eight VLA shown FIG. 2 are seen to be respectively formed from the satellite triplets of (90, 96, 102), (90, 102, 98), (90, 96, 104), (92, 102, 96), (90, 104, 98), (96, 92, 104), (102, 98, 92), and (92, 98, 104), with four of these triplets being "above" the earth in the hemisphere above the plane of the two-dimensional drawing sheet, and with the other four of these triplets being "below" the earth in the hemisphere below the plane of the two-dimensional drawing sheet. As previously discussed, the MIRIAH*12 configuration, being two MIRIAH*6 configurations rotating in opposite sense, will have, by analogy, sixteen satellite triplets forming sixteen VLA.

The MIRIAH*3 configuration has only a single VLA, formed by the satellite triplet of its three satellites, such as, for example, the MIRIAH*3 single VLA of FIG. 2, a subset of the MIRIAH*6 configuration, with the single VLA of the example MIRIAH*3 configuration being formed by the satellite triplet 90, 96, and 102.

Because the structure and operation of each VLA triad of three VLBI is the same, only a single representative VLA will be discussed in detail, it being understood that this discussion and explanation will suffice for all VLA triads of three VLBI.

Each VLA triad of satellites, such as the single VLA of this example MIRIAH*3 configuration, includes a first, a second, and a third VLBI pair formed by pairwise selecting two satellites from the VLA. For example, for this example MIRIAH*3 configuration, the three VLBI pair are: first VLBI pair 150 being formed by satellites 90 and 96; second VLBI pair 152 being formed by satellites 96 and 102; and third VLBI pair 154 being formed by satellites 102 and 90.

Because the structure and operation of each VLBI of each VLA triad of satellites is the same, only a single representative VLBI will be discussed in detail.

Figure 3:
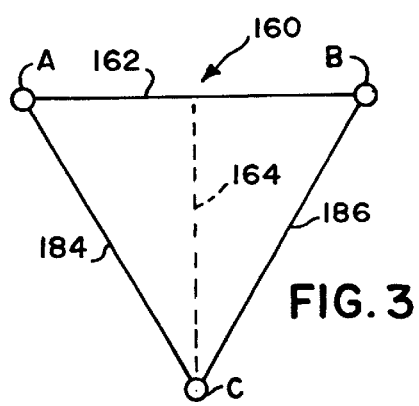
FIG. 3 shows the basic geometry of a VLBI triad of the present invention in one of the isometric planes.
Figure 4:
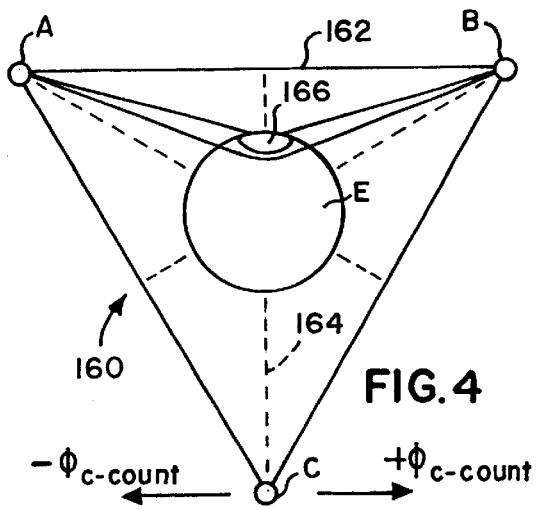
FIG. 4 is a diagrammatic view of a VLBI triad of the present invention imaging a field of view ("FOV") on a portion of a planet, for purposes of explaining the method of phase closure and phase count expansion of the present invention.
Figure 5:
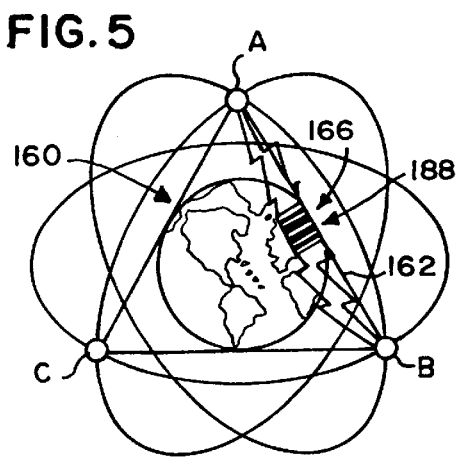
FIG. 5 is a diagrammatic view of a VLBI triad of the present invention imaging a portion of a planet, for purposes of explaining the interfaced Michelson and Fizeau interferometers of the present invention.

Referring to FIGS. 3–5, a representative VLA 160 is shown formed by satellite triad A, B, C. Of these three satellites, A and B are a VLBI pair, forming a VLBI 162 between them. The third satellite of the VLA, namely, satellite C, is used as "control" satellite for the VLBI pair, as discussed in detail hereinafter, and, because of the VLA triad's geometry, satellite C is on the phase centerline 164 for VLBI 162. As previously discussed, it should be understood that FIG. 3 shows only one of the VLBI sets of the three for VLA 160, there being three VLBI pairs for each VLA (e.g., A-B, B-C, and C-A).

Satellite C, the control satellite for the VLBI pair, performs remote control, holographic recording of the image data, phase error and timing synchronization for the VLA. Satellite A, at one end of the VLBI, has a first transmitter means 168 (the "A" transmitter, of Polarity #1) for illuminating the FOV 166 on the orbited planet E with a first transmitted signal 170 so that the first transmitted signal 170 is reflected from the FOV 166 after interfering with a second transmitted signal 172 from a like second transmitter means 174 on satellite B (the "B" transmitter, of Polarity #2) for illuminating the same FOV 166 on the orbited planet so that the second transmitted signal 172 is reflected from the FOV 166 after interfering with the first transmitted signal 170. Satellite B further has first receiver means 176 (the "A" receiver, of Polarity #1) for receiving the reflected 178 first transmitted signal and for producing first receiver imagery data. Satellite A further has second receiver means 180 (the "B" receiver, of Polarity #2) for receiving the reflected 182 second transmitted signal and for producing second receiver imagery data. The timing for satellites A and B is controlled by satellite C.

Preferably, the link frequency $F_L$ for the intra-satellite links 184 and 186 (A-C and B-C, respectively) is $2^n$ times the illumination frequency $F_0$ used by the A and B transmitter means 168, 174, where n is an integer (0, 1, 2, 3, ...). Link 184 (A-C) passes the imaging data from second receiver means 180 ("B" receiver) of satellite A to satellite C, preferably in the sidebands, and passes control data from satellite C to satellite A, as well as passing the Range and Range rate (whose product is constant). Similarly, link 186 (B-C) passes the imaging data from first receiver means 176 ("A" receiver) of satellite B to satellite C, preferably in the sidebands, and passes control data from satellite C to satellite B, as well as passing the Range and Range rate (whose product is constant).

Referring to FIG. 5, the operation of the interfaced Michelson interferometer (wideband, with fast counts, for registration control) and Fizeau Interferometer (narrowband, with slow counts, for imaging the FOV) can be explained.

The present invention used Fizeau interferometry in its imagery signal stream to image the FOV, slowly accumulating a "PSF" for every pixel in a very wide FOV as an analog holographic record. Then, typically some five to 45 minutes later (i.e., the minimum coherent dwell time, as explored in the conceptual parametric analysis), the system of the present invention detects the image, taking advantage of the enormous coherent gain of the present invention (as discussed hereinafter), and converts the holographic record to digital format.

In contrast, Michelson interferometry is used for registration control and to digitally maintain phase closure, and has much wider bandwidth, faster response time, and a much narrower FOV. It is well-known that performance of a Michelson interferometer is highly sensitive to the equilateral geometry of the VLA triads, and, if the control satellite is substantially off the VLBI phase centerline, the number of counts can become enormous and the performance becomes greatly degraded.

Figure 47:
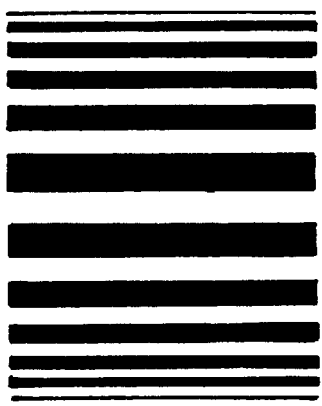
FIG. 47 is a representation of a one-dimensional Fourier plane interference pattern ("interferogram") recorded during one illumination time $T_{ill}(t)$ from a single VLBI.

The Fizeau interferometric fringes 188, shown diagrammatically in FIG. 5, and better shown in FIG. 47, are deposited slowly "look" by "look" at satellite C in the Fourier plane of the hologram, during the dwell time of illumination of the FOV, at low SNR, as hereinafter shown in the conceptual parametric analysis. Simultaneously, real-time phase closure information is passed from satellites A and B to satellite C on the VLBI phase centerline by the Michelson interferometer, at high SNR. It should be noted that the VLBI between each pair of satellites in the VLA, remembering that each side of the VLA is a VLBI, are also very high gain, point-to-point, wide bandwidth, signal and data carriers, causing the MIRIAH architecture of the present invention to be highly efficient.

The Fizeau "looks" from satellites A and B are recorded at satellite C on a holographic disk spinning on the isometric axis (normal to the plane of the VLA), thereby causing the system of the present invention to be stable, linear, orthogonal, and conformal.

Figure 48:
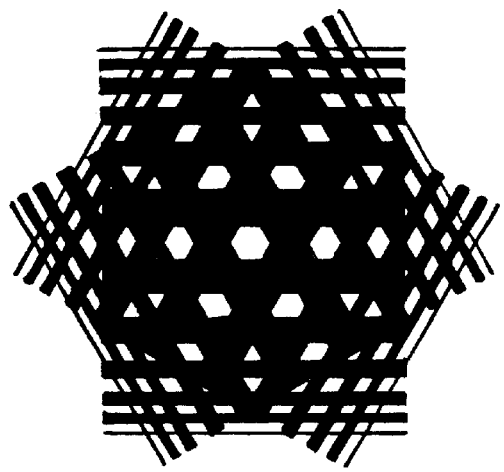
FIG. 48 is a two-dimensional interferogram formed by overlapping the three one-dimensional interferograms from all three VLBI of a VLA of the present invention.

FIG. 47 shows the Fourier plane interference pattern recorded during one illumination time $T_{ill}(t)$ from a single VLBI. It should be noted that this interference pattern is one-dimensional. However, by superimposing the Fourier plane interference patterns from all three VLBI of a VLA during one illumination time, the two-dimensional pattern shown in FIG. 48 is created. It should be noted that the blanked and open areas (line widths) get progressively smaller toward the edge of the pattern.

Figure 49:
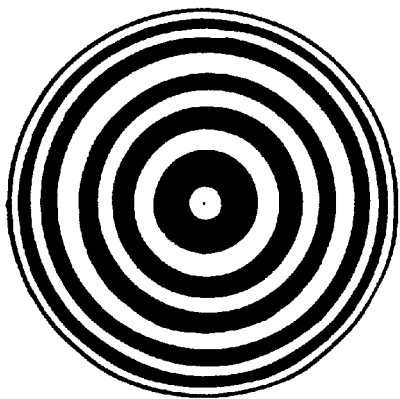
FIG. 49 is a representation of the composite two-dimensional "fully-filled" interferogram resulting from a complete orbital view cycle.

However, the method of the present invention continues to superimpose these Fourier plane interference patterns onto the holographic recording disc during the entire coherence time (one sidereal day for MIRIAH*3; one-half sidereal day for MIRIAH*6; one-quarter a sidereal day for MIRIAH*12), during which entire coherence time the coherent Gain vastly improves, and the rotation and migration of the VLA causes the coherent aggregation to change to the configuration shown in FIG. 49, which is a "zone plate" and is a Fresnel lens. It shall be understood that there is one of these Fresnel lenses for every pixel in the recorded image, and each of the recorded pixels now has the benefit of full coherent Gain of the present invention, i.e., $10^{16}$. Collectively, this collage of zone plates creates a hologram.

Referring to FIG. 4, the present invention's method for phase closure and phase count expansion can now be explained.

The phase count deviation from the phase centerline, $\phi_{C\text{-}Count}$, of the Michelson interferometer (a wide bandwidth, fast response-time device), is determined at satellite C, and this phase count deviation, in turn, is used to find the error in phase, $\Delta_{\phi VLBI}$, for the Fizeau imaging interferometer. It shall be understood that more sophisticated phase closure methods were developed for the huge Radio Telescope at Socorro, N.Mex., but the purposes of the present invention are adequately served with a much simpler method.

First, the two VLA angles adjacent to VLBI 162, i.e., to $VLBI_{A\text{-}B}$, are determined:

$$A = ATN\left[\frac{\sqrt{R_{A-C}^2 - \left(\frac{R_{A-B}}{2}\right)^2}}{\frac{R_{A-B}}{2} + \lambda(\phi_{C\text{-}Count})}\right] \text{ and}$$

$$B = ATN\left[\frac{\sqrt{R_{A-C}^2 - \left(\frac{R_{A-B}}{2}\right)^2}}{\frac{R_{A-B}}{2} - \lambda(\phi_{C\text{-}Count})}\right]$$

and similarly for the two angles adjacent to the other two VLBI (i.e., to $VLBI_{B\text{-}C}$ and to $VLBI_{C\text{-}A}$), which are then averaged and used to determine the angular closure error, $\epsilon_T$, where $$\epsilon_T = (A + B + C) - \pi$$

and $$A_{Adjusted} = A + \frac{\epsilon_T}{3} \text{ and } B_{Adjusted} = B + \frac{\epsilon_T}{3} \text{ and}$$

$$C_{Adjusted} = C + \frac{\epsilon_T}{3}$$

Then the phase deviation, $\Delta_{\phi VLBI}$, of VLBI 162, i.e., of $VLBI_{A\text{-}B}$, is given by, in radians, $$\Delta_{\phi VLBI} = \frac{R_{C-A}\cos(A_{Adjusted}) - R_{B-C}\cos(B_{Adjusted})}{\frac{R\sqrt{3}}{2}}\left(\frac{F_0}{F_L}\right)$$

and similarly for the other two VLBI of the VLA.

The bistatic transceiver's timing error is then given by (in seconds):

$$\Delta T_{XCVR} = \frac{\lambda \Delta_{\phi VLBI}}{3 \times 10^8}$$

Figure 18A:
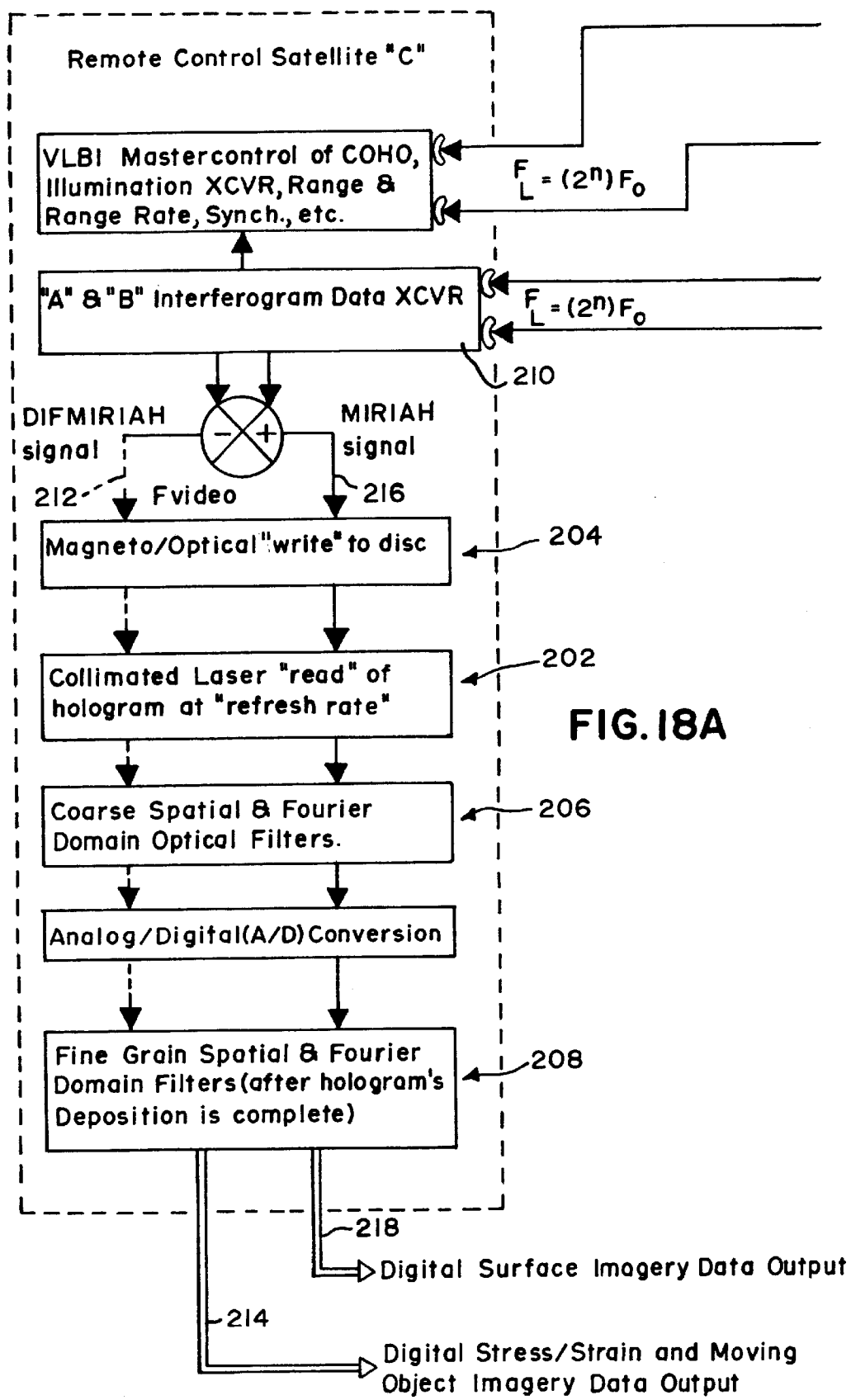
FIGS. 18A and 18B, taken together and arranged as shown in FIG. 18, are a preferred functional block diagram showing the operation and control of a satellite VLBI triad in accordance with the present invention.
Figure 18B:
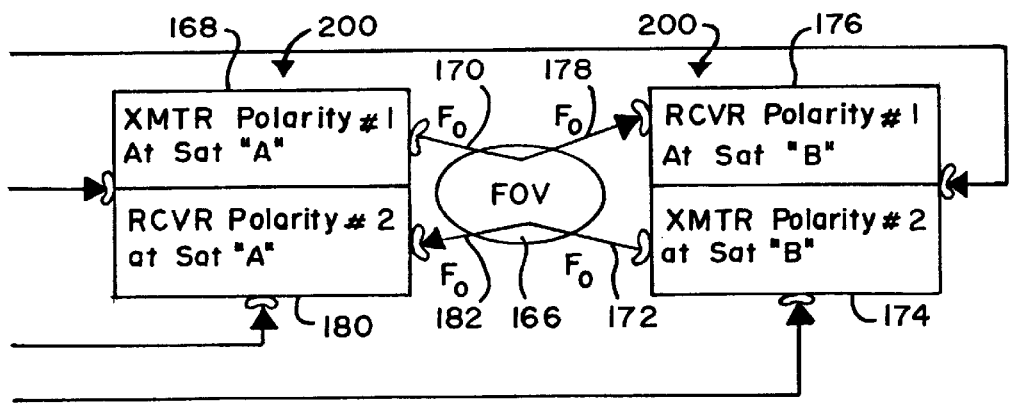
Figure 18:
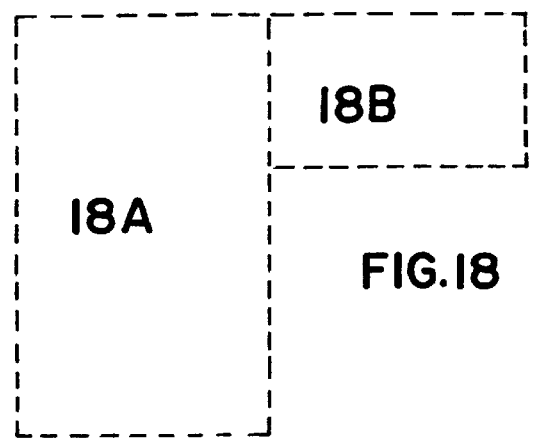

Referring to FIG. 18, several features of the structure of the present invention can be noted, as discussed later in greater detail during the parametric analysis.

The first Power-Apertures 200 of the Fizeau interferometer are at satellites A & B transmitters 168 and 174, and there are well-known power-aperture trade-offs that can be made between the first Power-Apertures 200 and the second Power-Aperture 202, where the hologram "read" acts as a Fresnel lens to increase the power density gain of the system and the SNR during coherent laser illumination of the hologram.

At 204, the system will "write" video (or laser) information from a recording disc's spindle to its outer edge, recording ICW's leading edge to trailing edge, using recording technology well-known to those skilled in the art.

Through a command communication channel, not shown, the user of the system may, as at 206, cause course spatial and Fourier domain optical filters to be selected prior to Analog-to-Digital conversion of the image signals and thus prior to loss of phase coherence, and also may, as at 208, cause fine grain spatial and Fourier domain filters to be selected after the hologram's deposition has been completed as a digitized reconstructed image.

The Fizeau interferometric imagery data from the first and second receivers on satellites A and B is transmitted over intra-satellite links using link frequencies $F_L$ to interferogram data transceiver 210 of satellite C, and the imagery data is then differenced to create a DIFMIRIAH signal 212 that is then processed to provide digital stress/strain and moving object imagery data at an output 214, and the imagery data passed to interferogram data transceiver 210 of satellite C is also summed to create the MIRIAH imagery data signal 216 that is then processed to provide digital surface imagery data output 218. It should be noted that the amount of data for the MIRIAH signal, 216, will be huge, whereas the amount of data for DIFMIRIAH will be much smaller.

FIGS. 6–12 show time-sequenced diagrammatic views of a VLBI triad of the present invention, showing the rotation and migration of the VLBI triad as the satellites mutually orbit the planet.

FIG. 6 shows the triad at a time when the VLBI is at its maximum length. As the time sequence progresses, note that the three VLBI baselines always keep their equilateral triangle shape, which is a necessary requirement for practical Michelson interferometry phase closure in real time. It should also be noted that the baselines remain invariantly within the isometric plane, equidistant from the three orthogonal orbits. The VLBI angular momentum vector is observed to remain constant, fixed parallel to the isometric axis. Because there are eight identical isometric planes in the MIRIAH*6 architecture, the slowly deposited, but continuously coherent, Fourier plane diffraction pattern records are conformal (i.e., do not have recording discontinuities from recording plane to recording plane). Such a result is very important for a commercial global imaging service. It should be noted that, as the sequence progresses, the VLBI both rotates and migrates to "fully fill" the synthetic aperture, after about $10^6$ or $10^9$ "looks". No other prior art architecture is known that can do this in practice.

It should be noted that the interferometer's propagation envelopes are orthogonal only in the isometric plane. Accordingly, calibration and registration is both simple and optimum for the present invention, whose recording disc is in the isometric plane.

And, because the geometry, classical mechanics, and dynamics meet the requirements for Walker's method, which is preferably used with the present invention to linearize the imagery data, the resulting imagery data is linear. See, Jack L. Walker, "Range-Doppler Imaging of Rotating Objects, IEEE Transactions on Aerospace and Electronic Systems, Vol. AES-16, No. 1, pages 23–52 (January 1980).

Figure 13:
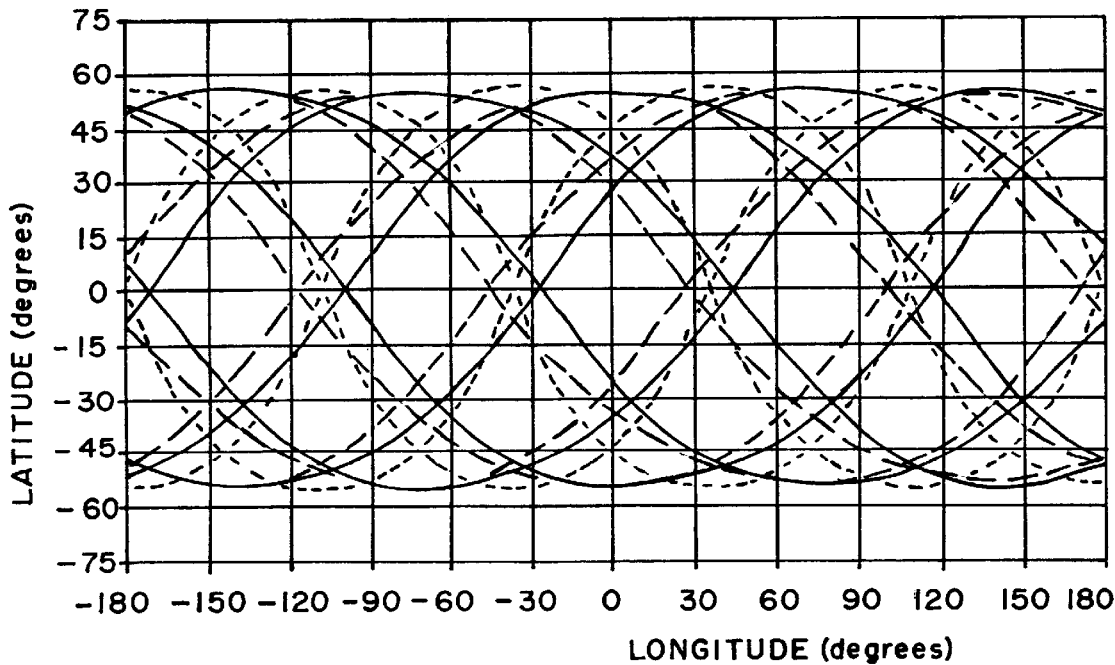
FIG. 13 is a graph showing the FOV center-trace coverage over a planet of a three-satellite configuration ("MIRIAH*3") of the present invention.

FIG. 13 is a graph showing the FOV center-trace coverage over a planet of a three-satellite configuration ("MIRIAH*3") of the present invention, retraced each sidereal day. As can be seen, MIRIAH*3 will daily cover all the populated regions of the earth, and most of the polar regions, provided the FOV extends over about 45° of arc (or more). If the MIRIAH*6 configuration is used instead of the MIRIAH*3 configuration, the small gaps at about latitude 0° and 35° will be smoothed out and covered as well. Additionally, the coverage span shown in FIG. 13 will be halved, and the retrace rate increased to once every 72 minutes (one-twentieth of a sidereal day) when MIRIAH*6 is used. This rate is improved yet again, to once every 36 minutes (one-fortieth of a sidereal day) when MIRIAH*12, with its twelve-satellite, dual rotation senses, configuration is used.

Figure 14:
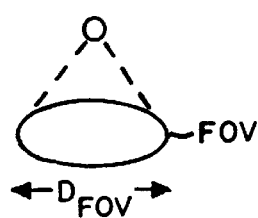
FIG. 14 is a diagram showing the divergent FOV illumination provided by prior-art SAR technology.
Figure 15:
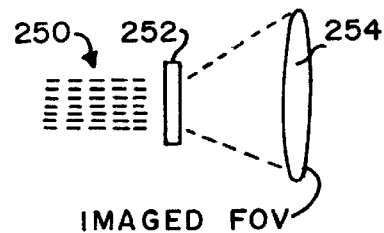
FIG. 15 is a diagram showing the formation of an imaged replica of the FOV by prior-art SAR technology, in which a collimated beam passes through a matched filter operating on the divergent FOV illumination provided by SAR technology.
Figure 16:
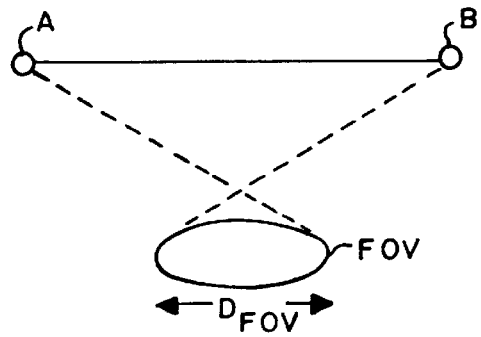
FIG. 16 is a diagram showing the convergent FOV illumination provided by the long VLBI of the present invention.
Figure 17:
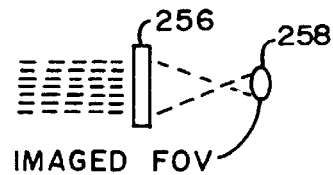
FIG. 17 is a diagram showing the formation of an imaged replica of the FOV by the method of the present invention, in which a collimated beam passes through a matched filter (hologram) operating on the convergent FOV illumination provided by the method of the present invention.

FIGS. 14–17 show how the extremely long VLBI enables the present invention to have superior results as compared with the prior art. The present invention's extremely long VLBI enables it to view a very large FOV and yet have convergent wave fronts. FIGS. 14 and 15 show the divergent illumination of prior art SAR, in which a short baseline is much shorter than the diameter of the FOV, will have divergent wave fronts. For SAR, the hypothetical second Power-Aperture collimated beam 250 operates through a matched filter 252 with divergent illumination at the FOV 254. In contrast, for the present invention, the matched filter 256 (i.e., the hologram), which is formed over the coherent dwell time, is a replica of the imagery datum illuminating the FOV, and acts as a converging "lens" with an incredible positive gain upon the imaged FOV 258.

The following is a conceptual parametric analysis of the signal performance of a three-satellite configuration ("MIRIAH*3"), which, as one of the preferred embodiments of the present invention, is shown, for example, in FIGS. 3–5, to enable a greater understanding of the benefits of the present invention. It should be understood that the following analysis is presented at the feasibility level of proof only, and that refinements to the following analysis will necessarily follow from experimental results to be obtained in the future. This feasibility-level conceptual analysis is appropriate for each of the Very Long Baseline Interferometers ("VLBI") of the eight very large array ("VLA") triads within the six-satellite configuration ("MIRIAH*6") preferred embodiment shown in FIG. 2, and also for each of the VLBI when a full twelve-satellite configuration ("MIRIAH*12") preferred embodiment is employed using the method of the present invention. This conceptual treatment explains and examines the basic expected interferometrically-illuminated microwave signal parametric analysis for coherent recordings of holographic data sets, and this basic analysis must then be heuristically extrapolated to the fully-multiplexed set of six and twelve satellites. A fully complete set of three-dimensional holographic recordings of the most preferred embodiment ("MIRIAH*12") will be obtained when the full twelve-satellite configuration is used with the method of the present invention. It shall be understood that, as an implementation design choice, independent holographic recording discs could and probably will be used for recording each frequency channel.

Referring to FIGS. 3–5 and 19–49, the conceptual parametric analysis can now be explained for the preferred embodiment of the invention.

This present parametric analysis assumes that the satellite architecture uses the 5:1 resonant orbits that are optimum for the preferred MIRIAH*6 and MIRIAH*12 architectures. Therefore, because coherence is maintained for a full sidereal day, after which the resonant record repeats itself, there will be a multiple overlay of holographic sets as shown partially formed in FIG. 48, each of which forms a sector of the accumulating phase record (or synthetic aperture). But, when formed by the coherently-integrated VLA of the MIRIAH*3 architecture, the interferogram record accumulates as a two-dimensional spatially-referenced matched filter, as a two-dimensional hologram that is the basis for the filter's two-dimensional synthetic aperture. For the 5:1 resonant orbit case, there will be ten "passes" per sidereal day for each VLA, where each new "pass" samples a solid angle of about 45 degrees, rotated about 36 degrees in aspect angle from the previous "pass". The following analysis will also show how the area of the resulting holographic plate is "fully filled" in the sense of a "fully-filled" two-dimensional synthetic aperture.

Each of the resulting holograms that together comprise a "perfect" spatially-referenced matched filter is capable of reconstruction into a two-dimensional image. However, when multiplexed into the full twelve-satellite MIRIAH*12 architecture, sixteen of these VLA holographic records will be distributed into the eight isometric planes hereinbefore described and shown in FIG. 2 and that circumscribe the orbited earth. This global viewing set of holographic records will then be capable of three-dimensional viewing. Because these eight isometric planes are at equal angles with respect to each other, the multiplexed set will be conformal. Therefore, if any pixel is not "fully filled" near the apex of any of the eight VLA, additional "fill" for that pixel will be provided from the three adjacent VLA. However, for the sake of clarity in the present conceptual parametric analysis, it will be assumed that the pixel of interest is located near the center of the three-satellite MIRIAH*3 VLA, because such a pixel at the center of a VLA is "fully filled" by that single VLA's holographic record. It then follows that each "fully filled" hologram, which is a two-dimensional matched filter, is the basis for a two-dimensional synthetic aperture.

It should be noted that such an approach is a complete departure from the one-dimensional aperture used in Synthetic Aperture Radar ("SAR"), with other far-reaching implications. For example, the preferred approach of the present invention enables a second power-aperture downstream of the first power-aperture's output at the Fourier plane of the hologram. This permits the signal-to-noise ratio ("SNR") to be computed at the output of the second power-aperture and thus in the image plane of the hologram. Because coherence is only present upstream of any Analog-to-Digital ("A/D") conversion, which necessarily destroys any phase information downstream of the conversion, all prior-art SAR technology must compute its SNR at the receiving antenna and can only use one power-aperture within the SAR's imaging stream. In contrast, because the preferred method of the present invention permits coherence to be maintained downstream of the first power-aperture's output, a dramatic breakthrough improvement in performance is obtained by the method of the present invention as compared to the prior art.

Using the well-known constants for $R_e$ (in meters), the radius of the earth, $$R_e = 6.38 \times 10^6$$

and for $\omega_e$ (in radians per second), the magnitude of the angular velocity of the earth, $$\omega_e = 7.292 \times 10^{-5}$$

and for $g_e$ (in meters per second$^2$), the gravitational acceleration constant, $$g_e = 9.7993$$

and choosing a preferred orbital angular velocity $\omega_0$ (in radians per second) of $$\omega_0 = 5\omega_e$$

the central radius $\rho_0$ (in meters) of an orbit is then given by:

$$\rho_0 = \sqrt[3]{g_e \frac{R_e^2}{\omega_0^2}}$$

with a nominal orbital altitude or height (in meters) above the earth of:

$$h_0 = \rho_0 - R_e$$

The wavelength $\lambda$ (in meters) is the input variable for this analysis, and is chosen as:

$$\lambda = 0.25$$

but it shall be understood that this conceptual analysis, and the underlying theory, is not restricted to this or any other wavelength that may be chosen, as desired.

Defining a hologram sector "fill" time or "dwell time" $T_D$ in seconds from a first time point $t_1$ to a second time point $t_2$ about an intermediate midpoint time $t_{mid}$ such that $$T_D = t_2 - t_1$$

and somewhat arbitrarily setting $$t_{mid} = \frac{\pi}{4\omega_0}$$

and $$t_1 = 0.75 \, t_{mid}$$

and $$t_2 = 1.25 \, t_{mid}$$

we get (in seconds):

$$T_D = 1.077 \times 10^3$$

Figure 38:
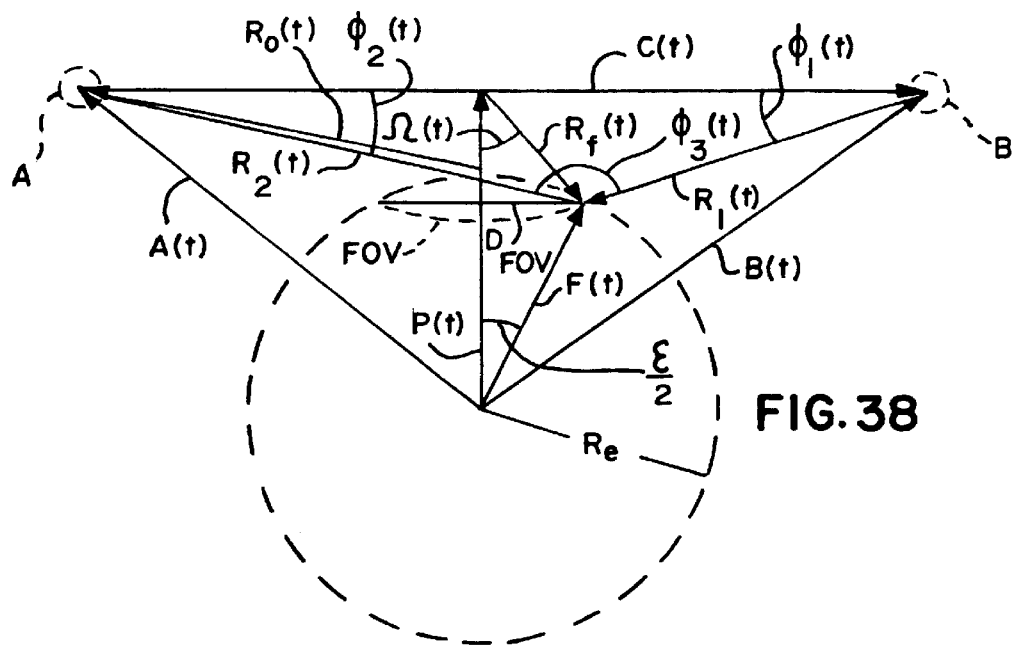
FIG. 38 is a diagram defining various vectors and angles used in the explanation of the parametric analysis of the present invention.

Referring to FIG. 38, using a rectangular co-ordinate system that is arbitrarily oriented in space with an origin at the earth's center, the vector A(t), in meters, from the earth's center to satellite A for a first (nominally circular) orbit within an xz plane is given as:

$$A(t) = \rho_0 \begin{bmatrix} \cos(\omega_0 t) \\ 0 \\ \sin(\omega_0 t) \end{bmatrix}$$

and the corresponding vector B(t), in meters, from the earth's center to satellite B for a second (nominally circular) orbit within a yz plane is given as:

$$B(t) = \rho_0 \begin{bmatrix} 0 \\ \sin(\omega_0 t) \\ \cos(\omega_0 t) \end{bmatrix}$$

Figure 19:
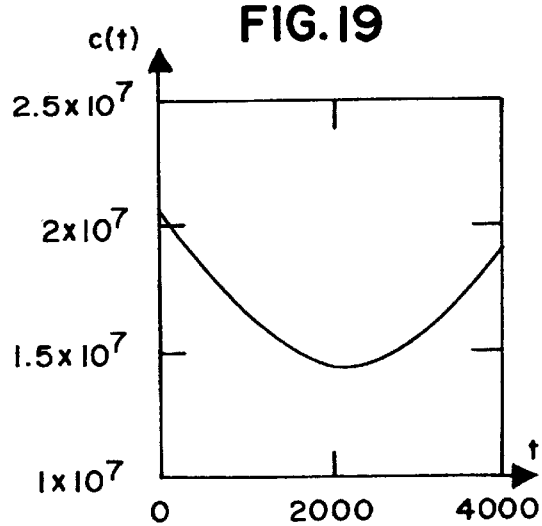
FIG. 19 is a graph of the magnitude (in meters) of c(t), the VLBI vector, versus orbit time t (in seconds) for a satellite VLBI of the present invention.

The VLBI vector C(t), in meters, from satellite A to satellite B, is defined as:

$$C(t) = B(t) - A(t)$$

and has a magnitude c(t), in meters, of $$c(t) = |C(t)| = \rho_0 \sqrt{2 - \sin(2\omega_0 t)}$$

which is shown in the graph of FIG. 19.

Figure 20:
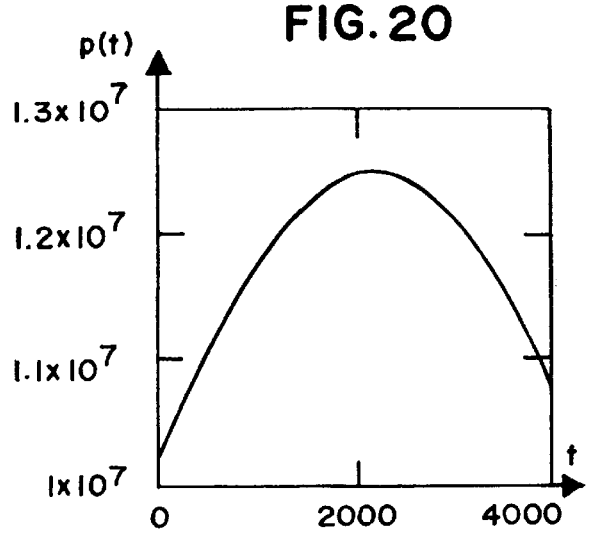
FIG. 20 is a graph of the magnitude (in meters) of p(t), the VLBI phase centerline vector, versus orbit time t (in seconds) for a satellite VLBI of the present invention.

The VLBI phase centerline vector P(t), in meters, from the center of the earth to the midpoint of the VLBI, is defined as:

$$P(t) = \frac{A(t) + B(t)}{2}$$

and has a magnitude p(t), in meters, of:

$$p(t) = |P(t)| = \frac{\rho_0 \sqrt{2 + \sin(2\omega_0 t)}}{2}$$

which is shown in the graph of FIG. 20.

For purposes of simplifying the graphs shown in the Figures of this specification, it shall be understood that a time interval t ranging only from 0 to 4000 seconds is graphed as a representative portion of the full graph of various times during the hologram fill period, because, for our chosen definition of $t_{mid}$ such that, in seconds, $$2 \, t_{mid} = 4.308 \times 10^3$$

the graphed time interval is truncated about 300 seconds short of the full hologram fill period. It shall be understood that the graphs shown, while slightly truncated, can be trivially extended to the full hologram fill period without altering this analysis.

The angular momentum vector $M_c$ of the VLBI is defined by the vector cross product of the VLBI vector and its derivative, namely, $$M_c = C(t) \times \dot{C}(t)$$

such that $$M_c = \rho_0^2 \omega_0 \begin{bmatrix} -1 \\ -1 \\ -1 \end{bmatrix}$$

with a magnitude of $$|M_c| = \rho_0^2 \omega_0 \sqrt{3}$$

and fixed in space aligned along an isometric axis of $$\begin{bmatrix} -1 \\ -1 \\ -1 \end{bmatrix}$$

The angular velocity vector $\omega_c(t)$ of the VLBI is fixed along this same isometric axis such that $$\omega_c(t) = \frac{M_c}{|C(t)|^2} = \frac{M_c}{c(t)^2} = \frac{\omega_0}{(2 - \sin(2\omega_0 t))} \begin{bmatrix} -1 \\ -1 \\ -1 \end{bmatrix}$$

Similarly, the angular momentum vector $\omega_p(t)$ of the VLBI phase centerline is fixed along an adjacent isometric axis such that $$\omega_p(t) = \frac{\omega_0}{(2 + \sin(2\omega_0 t))} \begin{bmatrix} -1 \\ -1 \\ +1 \end{bmatrix}$$

The respective magnitudes $w_c(t)$ and $w_p(t)$ of $\omega_c(t)$ and $\omega_p(t)$ are $$w_c(t) = \frac{\omega_0 \sqrt{3}}{(2 - \sin(2\omega_0 t))} \quad \text{and} \quad w_p(t) = \frac{\omega_0 \sqrt{3}}{(2 + \sin(2\omega_0 t))}$$

Referring to FIG. 38, and defining the two constituent vector components $\epsilon_c$ and $\epsilon_p$ of $\epsilon$, the angle traversed in the FOV during the hologram sector "dwell time", as $$\varepsilon_c = \int_{t_1}^{t_2} w_c(t) dt \quad \text{and} \quad \varepsilon_p = \int_{t_1}^{t_2} w_p(t) dt$$

and defining $\beta(t)$ as the angle (in radians) between the isometric planes normal to $\omega_c(t)$ and $\omega_p(t)$ such that $$\beta(t) = a\cos\left(\frac{\omega_c(t) \cdot \omega_p(t)}{|\omega_c(t)| \cdot |\omega_p(t)|}\right)$$

we see that, in radians, $$\beta(0) = 1.230959$$

and that, as graphed in FIG. 41, $\beta(t)$ is a constant because the angular momentum is constant. The same angle expressed in degrees, $\beta_{deg}(t)$, is seen to be $$\beta_{deg}(t) = \frac{180}{\pi} \beta(t)$$

such that, in degrees, $$\beta_{deg}(0) = 70.529°$$

By the Law of Cosines in spherical trigonometry, $$\epsilon = a\cos[(\cos(\epsilon_c)\cos(\epsilon_p)) + (\sin(\epsilon_c)\sin(\epsilon_p)) \cdot \cos(\beta(0))]$$

such that, in radians, $$\epsilon = 0.62$$

and, in degrees, $$\varepsilon_{deg} = \frac{180}{\pi} \varepsilon = 35.529°$$

The diameter, in meters, of the field of view ("FOV") on the earth is thus $$D_{FOV} = 2R_e \sin\left(\frac{\varepsilon}{2}\right)$$

Still referring to the vector definitions shown in FIG. 38, the vector F(t) is given as $$F(t) = R_e \left[\left(\frac{P(t)}{|P(t)|}\cos\left(\frac{\varepsilon}{2}\right)\right) + \left(\frac{C(t)}{|C(t)|}\sin\left(\frac{\varepsilon}{2}\right)\right)\right]$$

and the two bistatic range vectors $R_1(t)$ and $R_2(t)$ are respectively given as $$R_1(t) = F(t) - B(t)$$

and $$R_2(t) = A(t) - F(t)$$

with respective bistatic range magnitudes $R_{n1}(t)$ and $R_{n2}(t)$ of $$R_{n1}(t) = |R_1(t)|$$

and $$R_{n2}(t) = |R_2(t)|$$

The vector $R_o(t)$ from the center of the FOV to satellite A is given as $$R_0(t) = A(t) - R_e \frac{P(t)}{|P(t)|}$$

and, by symmetry, because the center of the FOV is equidistant from both satellite A and satellite B, the magnitude of range, $R_{no}(t)$, in meters, is the same from either satellite A or B to the center of the FOV, and is given as $$R_{no}(t) = |R_0(t)|$$

Figure 21:
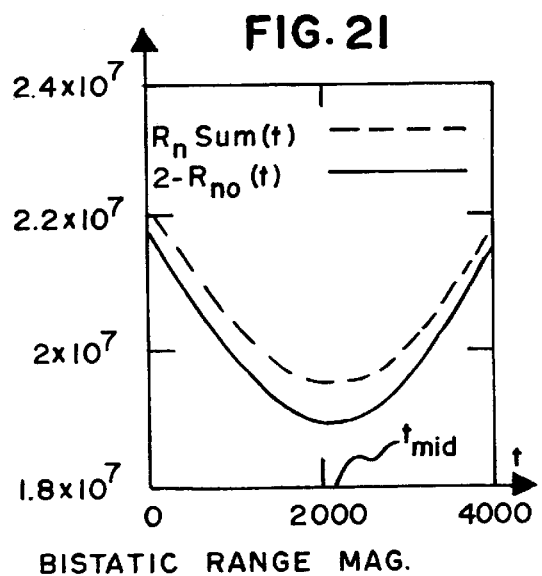
FIG. 21 is a graph of the sum $R_n$Sum(t) of the two bistatic range magnitudes (in meters) versus orbit time t (in seconds), as well as a graph of twice the magnitude of range Rno(t) from either of the two imaging satellites to the center of the FOV (in meters) versus orbit time t (in seconds), for a satellite VLBI of the present invention.
Figure 22:
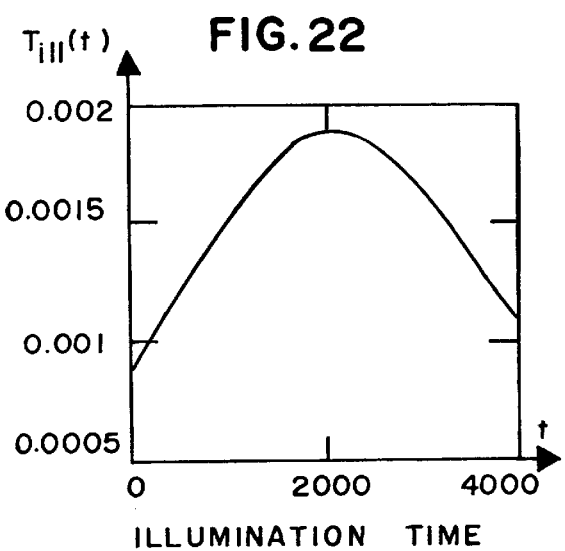
FIG. 22 is a graph of the illumination time $T_{ill}(t)$ (in seconds) versus orbit time t (in seconds), for a satellite VLBI of the present invention.

The total bistatic range magnitude, $R_{nSum}(t)$, in meters, is thus $$R_{nSum}(t) = R_{n1}(t) + R_{n2}(t)$$

and both $R_{nSum}(t)$ and twice $R_{no}(t)$ are graphed in FIG. 21, both having a minimum at $t_{mid}$. From the graph shown in FIG. 21, it will be understood that the signal arriving at the receiving antenna has its leading edge from the FOV center and its trailing edge from the FOV edge. It follows that the illumination time $T_{ill}(t)$ is thus given, in seconds, as $$T_{ill}(t) = \frac{R_{nSum}(t) - 2R_{nO}(t)}{3 \times 10^8}$$

and as graphed in FIG. 22, with the maximum illumination time $T_{illMax}(t)$, in seconds, being $$T_{illMax}(t) = T_{ill}(t_{mid}) = 1.918 \times 10^{-3}$$

The sampling frequency SRF(t), in Hz, is the rate at which rasterized writing occurs from the spindle onto the recording disc's edge in both ICW and CW modes, and is given by $$SRF(t) = \frac{1}{T_{ill}(t)}$$

with the minimum sampling frequency $SRF_{min}$ and the maximum sampling frequency $SRF_{max}$ being respectively given by $$SRF_{min} = SRF(t_{mid}) = 521.319$$

and $$SRF_{max} = SRF(0) = 1.11 \times 10^3$$

Integrating SRF(t) over the entire interval for the hologram sector fill time, it follows that $$Counts = \int_{t_1}^{t_2} SRF(t) dt = 5.71 \times 10^5$$

Referring again to FIG. 38 and defining $R_f(t)$ as the range vector from the VLBI center to F(t) such that $$R_f(t) = F(t) - P(t)$$

it follows that $\Omega(t)$, the aspect angle to F(t), is $$\Omega(t) = acos\left(\frac{-P(t) \cdot R_f(t)}{|P(t)||R_f(t)|}\right)$$

It is well-known in the prior art to embed multi-channel elements on the surface of a single antenna using, for example, the methodology of Ball Aerospace & Technologies Corp., located in Boulder, Colo., U.S.A., and the use of such technology is assumed here for the preferred embodiment of the invention. Hence, the longer wavelength channels will cover a larger area than the shorter wavelength channels, but all will have the sane beamwidth, BW(t). Using the vector dot products to find the direction cosines of the two grazing angles $\phi_1(t)$ and $\phi_2(t)$ shown in FIG. 38 respectively gives $$\phi_1(t) = acos\left(\frac{-C(t) \cdot R_1(t)}{|C(t)||R_1(t)|}\right) \text{ and } \phi_2(t) = acos\left(\frac{-C(t) \cdot R_2(t)}{|C(t)||R_2(t)|}\right)$$

Figure 23:
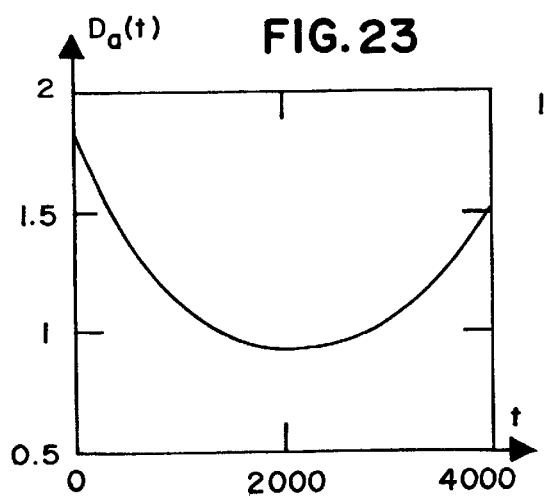
FIG. 23 is a graph of the effective antenna diameter $D_a(t)$ (in meters) versus orbit time t (in seconds), for a satellite VLBI of the present invention.

The antenna beamwidth BW(t), in radians, is thus $$BW(t) = \phi_1(t) - \phi_2(t)$$

and the antenna diameter $D_a(t)$, in meters, is thus $$D_a(t) = \frac{\lambda}{BW(t)}$$

as shown graphically in FIG. 23. However, it shall be understood that the antenna is a rigid object of fixed diameter, so, in practice, the widest beamwidth for a given wavelength will be used to assure continuous illumination coverage. Accordingly, the beamwidth is set at the minimum for $D_a(t)$ such that, in meters, $$D_a = D_a(t_{mid})$$

and this fixed beamwidth, in radians, is thus $$Bw = BW(t_{mid})$$

or, in degrees, $$Bw = \frac{180}{\pi} BW(t_{mid}) = 15.613°$$

Assuming equal antenna areas $A_t$ and $A_r$ for the transmitting and receiving antennas, respectively, such that $$A_t = \frac{\pi D_a^2}{4} \text{ and } A_r = \frac{\pi D_a^2}{4}$$

and assuming an antenna efficiency $\eta$ such that $$\eta = 0.55$$

the physical gains $G_t$ and $G_r$ for the assumed-identical transmitting and receiving antennae are $$G_t = \frac{4\pi A_t \eta}{\lambda^2} = 73.106$$

and $$G_r = G_t$$

Conventional practice defines the (un-normalized) Radar Cross Section ("RCS") as the product of $\sigma_o(t)$, the normalized RCS, times the area of the resolved target, $\zeta^2$. FIG. 42, taken from page 114 of Kiyo Tomiyasu, "Conceptual Performance of a Satellite Borne Wide Swath SAR, IEEE Trans. on Geoscience and Remote Sensing, Vol. GE-19, No. 2 (April 1981), shows a graph of $\sigma_o(t)$, a (unitless) typical normalized RCS for an average rural scene such as farm land, where $$\sigma_0(t) = 0.005 \cot^2(\Omega(t))$$

It shall be understood that more accurate formulae for $\sigma_o(t)$ exist and are well-known functions of $\lambda$, $\Omega(t)$, and the spectral reflectance, but the above formula for a typical RCS for an average rural scene is adequate for purposes of the present analysis.

A calculation of $E_1(t)$, the Signal Energy Density at the FOV delivered from the transmitting antenna during the illumination period $T_{ill}(t)$, and of $E_2(t)$, the Signal Energy Density at the receiver antenna arriving from the resolved point area in the FOV, and of $E_3(t)$, the Signal Energy Density for the receiver antenna at the Fourier plane (i.e., to the disc "write" surface), will now be presented. Let the transmitter power, $P_{Trans}$, in watts, be chosen as:

$$P_{Trans}=1.0$$

As discussed further hereinbelow, this value for $P_{Trans}$ may be iterated, if desired, to a different value such that the signal-to-noise ratio becomes a value, such as 50 db, as may be needed for adequate ground penetration. It will be understood that such an iteration for the value of $P_{Trans}$ will propagate through the analysis presented hereinafter because of algebraic dependencies on the value of $P_{Trans}$.

During the first signal phase, the FOV, having an area, in meters, of $$A_{FOV} = \frac{\pi D_{FOV}^2}{4}$$

is illuminated. For purposes of calculating $E_1(t)$ and $E_2(t)$, a loss L is assumed such that $$L=2.0$$

As shown in greater detail hereinafter, the resolution of the VLA, $D_{res}(t)$, ranges from about 0.1 λ to about 0.25 λ. However, to reduce specularity, we let the resolution ζ of the resolved target be twice this range in values such that $$\zeta=0.5\lambda$$

with $E_1(t)$, the energy density at the FOV delivered during the illumination period $T_{ill}(t)$, being given by $$E_1(t) = \frac{P_{Trans} \cdot T_{ill}(t) \cdot G_t}{4\pi R_{n1}^2(t) \cdot L}$$

and with $E_2(t)$, the energy density at the receiving antenna, arriving from the resolved point area, $\zeta^2$, in the FOV, being given by $$E_2(t) = \frac{E_1(t) \cdot \zeta^2 \cdot \sigma_0(t)}{4\pi R_{n2}^2(t) \cdot L}$$

The longest (baseline) coherence time, $T_{coh}$, is set by the recurrent earth traces in the 5:1 resonant orbit, and occurs at a period of one sidereal day (or inertial day) such that, in seconds per sidereal day, $$T_{coh} = 24 \cdot 60 \cdot 60 \cdot \frac{365.25}{366.25} = 8.616 \times 10^4$$

By the Uncertainty Principle of physics, the bandwidth B must be $$B = \frac{\pi}{T_{coh}}$$

and the temperature T, in degrees Kelvin, seen by the antenna is $$T=290°$$

Using the well-known Boltzmann's constant, k, in Joules per degree Kelvin, where $$k=1.38\times10^{-23}$$

the noise energy density, $N_o$, in watt-seconds per square meter, is given by $$N_0=kTB$$

It should be noted that the magnitudes of the coefficient for both power density and energy density are the same because we assume that the earth's temperature is constant in time.

It will be noted, as previously discussed, that satellite C, with the benefit of the receiver's gain, mixes the two signals for $E_2(t)$ via the communication links shown in FIG. 18, and then records the resulting signal onto the Fourier plane of the holographic recording disc, preserving phase coherence information.

The energy density at the Fourier plane of the recording disc, including the receiving antenna's gain $G_r$, is given by $$E_3(t)=E_2(t) \cdot G_r$$

It should be noted that the receiving antenna's gain, $G_r$, is not available for use in calculating the corresponding energy density for prior-art SAR technology, because phase detection by prior-art SAR technology occurs on the SAR antenna face.

Figure 24:
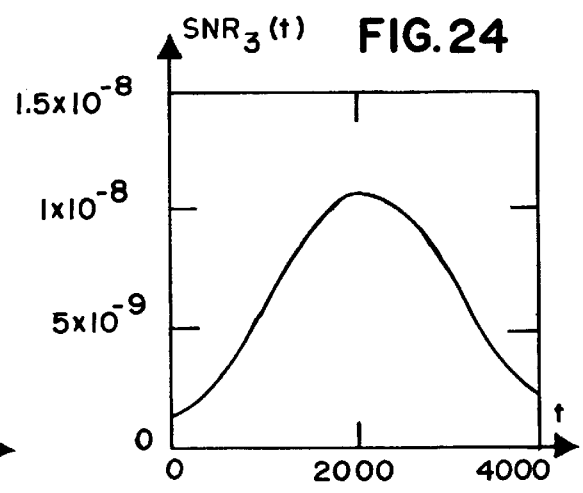
FIG. 24 is a graph of $SNR_3(t)$, the (unitless) signal-to-noise ratio at the Fourier imaging plane of the hologram disc, versus orbit time t (in seconds), for a satellite VLBI of the present invention.

FIG. 24 is a graph of $SNR_3(t)$, the (unitless) signal-to-noise ratio at the Fourier imaging plane of the hologram disc, where $$SNR_3(t) = \frac{E_3(t)}{N_0}$$

It should be noted that $SNR_3(t)$ is far below the noise level. However, because the recording in the Fourier plane is still coherent, because it is upstream of the A/D conversion point, it will be understood that, if the gain in the matched filter is large enough, the SNR in the imaging plane can still be very large.

Figure 39:
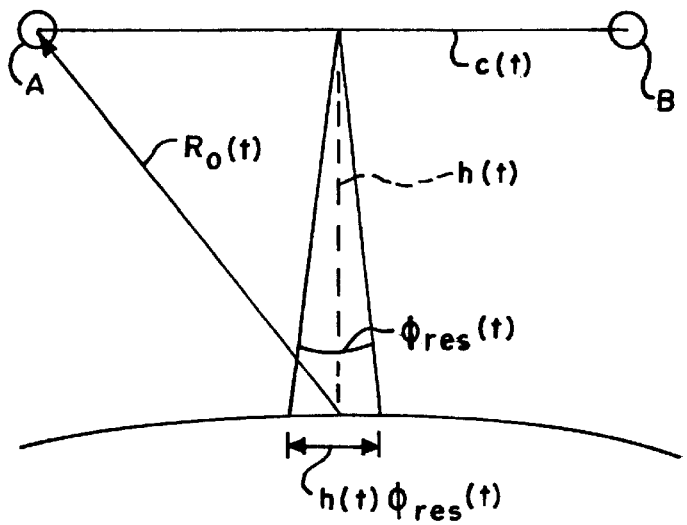
FIG. 39 is a diagram depicting the angular resolution, $\phi_{res}(t)$, and the linear ground resolution, $h(t)\phi_{res}(t)$, of a single VLBI of the present invention.
Figure 40:
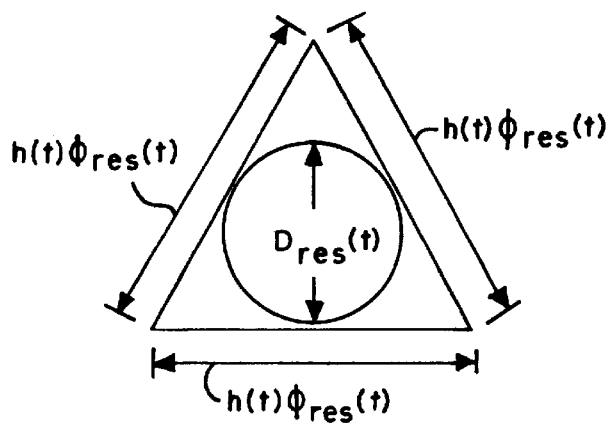
FIG. 40 is a plan view of a resolved point pixel having a diameter (in meters) of $D_{res}(t)$ for purposes of explaining the expected Field-of-View resolution of a VLA of the present invention.

FIG. 39 shows the linear ground resolution $h(t)\phi_{res}(t)$ of a single VLBI (out of the three in each VLA) is based on the altitude or height h(t) of the center of the VLBI above the earth (i.e., the distance from the interferometer to the FOV) and on the conventional angular resolution $\phi_{res}(t)$ for an interferometer having a length and vector magnitude of c(t). This linear ground resolution $GrndRes_{Int}(t)$ of a single VLBI, i.e., $h(t)\phi_{res}(t)$, is shown graphically in FIG. 26, and is also shown graphically as a fraction of wavelength (i.e., $GrndRes_{Int}(t)/\lambda$) in FIG. 27. FIG. 40 is a plan view of a resolved point pixel having a diameter (in meters) of $D_{res}(t)$ as measured at the surface of the FOV. It shall be understood that each VLA has three phase-synched VLBI. Referring to FIGS. 39 and 40, note that the height h(t) is related to p(t), the magnitude of the phase centerline vector P(t), by $$h(t)=p(t)-R_e$$

and that $\phi_{res}(t)$, the angular resolution, is related to c(t), the magnitude of the VLBI vector C(t), by $$\phi_{res}(t) = \frac{\lambda}{c(t)}$$

so that $$D_{res}(t) = h(t) \cdot \phi_{res}(t) \cdot \tan\left(\frac{\pi}{6}\right) = \frac{h(t) \cdot \lambda \cdot \tan\left(\frac{\pi}{6}\right)}{c(t)} \text{ with}$$

-continued $$\frac{D_{res}(0)}{\lambda} = 0.108 \text{ and}$$

$$\frac{D_{res}(t_{mid})}{\lambda} = 0.245$$

so that $D_{res}(t)$ is seen to range from about 0.1 λ to about 0.25 λ, as previously mentioned. It should be noted that $D_{res}(t)$ is about twice as fine (half as large) as the value of the resolution ζ used previously.

The width of the illuminated swath $D_{Swath}(t)$ is thus $$D_{Swath}(t) = R_{nSum}(t) \cdot Bw$$

i.e., the product of the total bistatic range magnitude $R_{nSum}(t)$ and the fixed beamwidth Bw, both discussed previously.

The diameter of the illuminated "footprint" $D_{foot}(t)$ is given by $$D_{foot} = \frac{2\sin\left(\frac{Bw}{2}\right) \cdot (R_{nSum}(t))}{\cos\left(\frac{\phi_1(t) + \phi_2(t)}{2}\right)}$$

The two-dimensional holographic gain, $G_{holo}(t)$, is simply the ratio of the pixel area to the illuminated area, or $$G_{holo}(t) = \frac{D_{foot}(t) \cdot D_{Swath}(t)}{(D_{res}(t))^2}$$

which is shown graphically in FIG. 43. It should be understood that this simplistic method of analysis only approximates the more elegant convolution integrals used in matched filter theory, but this simplistic analysis is sufficient for the conceptual parametric analysis presented here for an understanding of the present invention.

It should be noted that $G_{holo}(t)$ compares closely with the two-dimensional Synthetic Aperture Gain, $G_{SynAp}(t)$, of the VLA, as will now be shown. The "swept" area, $A_{VLA}$, of the VLA (i.e., the synthetic aperture area "filled" during the coherence time $T_{coh}$) is given by $$A_{VLA}(t) = \pi \cdot \left(\frac{c(t)}{2\cos\left(\frac{\pi}{6}\right)}\right)^2$$

where c(t) is the previously-discussed magnitude of the VLBI vector C(t). The two-dimensional Synthetic Aperture Gain is then given by the well-known formula $$G_{SynAp}(t) = \frac{4\pi \cdot A_{VLA}(t) \cdot \eta}{\lambda^2}$$

and is shown graphically in FIG. 28. It should be noted that this gain for the present invention is enormous, being on the order of $10^{16}$, which will be understood to be an extraordinary improvement over the prior art. It should also be noted that this Synthetic Aperture Gain correlates fairly closely with the matched filter approximation method used above. This correlation would probably have been closer if the effects of Walker's method had been used. to linearize the matched filter, as discussed in Jack L. Walker, "Range-Doppler Imaging of Rotating Objects, IEEE Transactions on Aerospace and Electronic Systems, Vol. AES-16, No. 1, pages 23–52 (January 1980). The more accurate modeling of Walker's method is omitted for simplicity and clarity in the conceptual parametric analysis presented here for an understanding of the present invention.

Another way of looking at the matched filter Gain is to consider the energy focusing power of the entire hologram down to the level of a single resolved pixel. This is the same as the concentration of the collimated energy density across the entire Fourier plane as compared to the energy density in the single resolved pixel, as discussed hereinafter in connection with a Bragg's law analysis of the interferometer fringe width considerations. The replication from the Fourier plane to the image plane is a scaled transform of the energy accumulated by the interferometer in the FOV during the coherence time Tcoh as compared to that at the single resolved point in the FOV. Therefore, this energy focusing power must be the same as $G_{holo}$, as will now be shown.

The Bragg's law analysis, discussed hereinafter, shows that the resolved pixel is illuminated in the Fourier plane across the entire format. Because the energy density gain in the transformation from the Fourier plane to the image plane replicates the accumulated illumination energy of the FOV to the pixel point resolved in the FOV during $T_{coh}$, the number of ground resolved object areas in the FOV, namely, Objects(t), must be the same as the gain of the matched filter. Accordingly, $$Objects(t) = \frac{\frac{\pi}{4}(D_{foot}(t) \cdot D_{Swath}(t))}{\frac{\pi}{4}(D_{res}(t))^2} = \frac{(D_{foot}(t) \cdot D_{Swath}(t))}{(D_{res}(t))^2}$$

as shown graphically in FIG. 44. Defining $$Correlation(t) = \frac{G_{holo}(t)}{Objects(t)}$$

it is observed that this correlation equals 1.0 (i.e., a "perfect" correlation), as shown graphically in FIG. 45.

The energy density $E_4(t)$ in the image will therefore be $$E_4(t) = E_3(t) \cdot G_{holo}(t)$$

and the signal-to-noise ratio $SNR_4(t)$ in the image plane will therefore be $$SNR_4(t) = \frac{E_4(t)}{N_0}$$

as shown graphically in FIG. 46. Clearly, with a signal-to-noise ratio this large, there will be considerable penetration of the subsoil in the FOV. As previously mentioned, it should be noted that, with the present invention, the signal-to-noise ratio keeps increasing past the point where $E_2(t)$ is calculated because coherence is maintained downstream of the first power-aperture's output. In contrast, with prior art SAR technology, all phase information is destroyed by the initial A/D conversion at the receiving antenna, thereby necessarily preventing any further downstream improvement in the signal-to-noise ratio.

It will be noted that this resulting signal-to-noise ratio $SNR_4(t)$ is huge, thereby permitting an implementation design trade-off between signal-to-noise ratio and transmitter power $P_{Trans}$, which was previously assumed to be one watt for purposes of the foregoing conceptual analysis. Accordingly, the foregoing analysis may be iterated, if desired, to achieve a desired minimum signal-to-nose ratio $SNR_{4DesiredMin}$, by using a new value $P_{TransIterated}$ as an appropriately-scaled version of the previous value for $P_{Trans}$, such that $$P_{TransIterated} = \frac{SNR_{4DesiredMin}}{SNR_4(0)} P_{Trans}$$

where $SNR_4(0)$ is used in the scaling factor because it is seen to be the "worst case" value for $SNR_4(t)$.

It will now be shown how a Doppler signal will be present in the Fourier plane but will not get through the bandpass of the matched filter hologram, so that the Doppler signal contribution will not be present in the image plane. Accordingly, the resulting image will be seen to only be a function of the VLA's interferogram imagery datum.

Now define $W_e$ as the vector for the constant angular velocity of the earth, such that $$W_e = \omega_e \cdot \begin{bmatrix} 0 \\ 0 \\ -1 \end{bmatrix}$$

It should be noted that the full twelve-satellite configuration ("MIRIAH*12") of the present invention has two rotational senses, one sense being with the earth's rotation, and the other sense being against the earth's rotation. If desired, the absence of the Doppler signal in the image plane can be verified for the counter-rotation case simply by repeating the following analysis using $$W'_e = \omega_e \cdot \begin{bmatrix} 0 \\ 0 \\ +1 \end{bmatrix}$$

Figure 25:
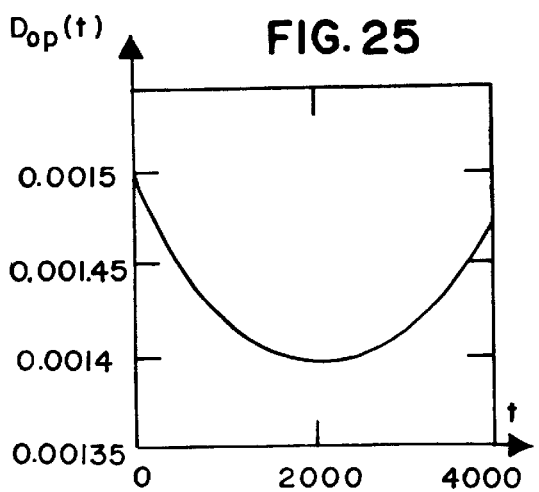
FIG. 25 is a graph of the Doppler shift frequency $D_{op}(t)$ (in Hz) versus orbit time t (in seconds), for a satellite VLBI of the present invention.
Figure 26:
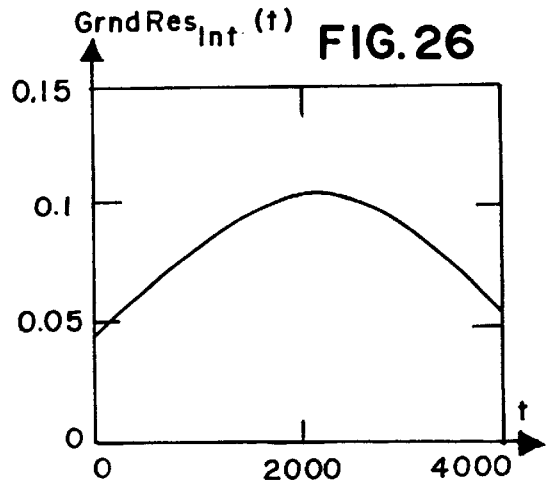
FIG. 26 is a graph of the ground resolution $GrndRes_{Int}(t)$ of the VLBI interferometer in the field of view (in meters) versus orbit time t (in seconds) at a wavelength of 0.25 meters, for a satellite VLBI of the present invention.

Because vector F(t) shown in FIG. 38 is normal to the spherical surface of the earth and has a constant magnitude, namely, the radius of the earth $R_e$, only two orthogonal components, respectively parallel to P(t) and C(t), contribute to the velocity vector $V_f(t)$. The velocity vector $V_f(t)$, in meters per second, is thus a vector sum of three vector cross products, such that $$V_f(t) = (\omega_c(t) \times F(t)) + (\omega_p(t) \times F(t)) + (W_e \times F(t))$$

and the Doppler shift magnitude, Dop(t), in Hz, for a satellite VLBI of the present invention, is thus $$Dop(t) = \left| \frac{(V_f(t) \cdot R_1(t)) + (V_f(t) \cdot R_2(t))}{\lambda \cdot |R_1(t)||R_2(t)|} \right|$$

as shown graphically in FIG. 25, with a maximum shift being Dop(0). It will be noted that, as a percentage of wavelength, this Doppler shift is quite small because $$\frac{Dop(0) \cdot \lambda}{3 \times 10^8} \cdot 100 = 1.26 \times 10^{-10} \%$$

thereby allowing adjacent hyperspectral bands used for microwave communication by the satellites of the present invention to be very closely spaced for improved discrimination of individual specie "signatures" in the frequency domain, thereby greatly improving over the prior art in multi-spectral imaging for Ground Information Systems ("GIS").

In order for adjacent microwave communication channels used by the satellites of the present invention to be non-overlapping and separate in the presence of this Doppler shift, it is necessary that they be separated by a Doppler shift bandwidth, $B_{Dop}(t)$, at least as great as this Doppler shift, such that $$B_{Dop}(t) = \left| \frac{(V_f(t) \cdot R_1(t)) + (V_f(t) \cdot R_2(t))}{\lambda \cdot |R_1(t)||R_2(t)|} \right|$$

Because of the Uncertainty Principle of Physics, all electronic systems are characterized by a bandwidth B and a response time T, wherein the following relationship always holds true:

$$B \cdot T = \pi$$

Because it takes one entire sidereal day for any one VLBI to complete its traverse to the point where the trace of that VLBI once again begins to repeat its swath in its resonant orbit, the response time $T_{CohInt}$ for the coherent interferometer is given, as before, by (in seconds):

$$T_{CohInt} = 24 \cdot 60 \cdot 60 \cdot \frac{365.25}{366.25} = 8.616 \times 10^4$$

with the bandwidth $B_{CohInt}$ of the coherent interferometer then being given by (in Hz):

$$B_{CohInt} = \frac{\pi}{T_{CohInt}} = 3.646 \times 10^{-5}$$

Note that, by the equation above for $B_{Dop}(t)$, the Doppler bandwidths (in Hz) at 0 and 2000 seconds are seen to be:

$$B_{Dop}(0) = 1.528 \times 10^{-3}$$

and $$B_{Dop}(2000) = 1.432 \times 10^{-3}$$

thereby showing that only the interferogram signal will appear in the final image, without a Doppler signal contribution, because the Doppler signal is of too large a bandwidth to pass through the bandwidth $B_{CohInt}$ of the coherent interferometer, i.e., because $$B_{Dop}(t) \gg B_{CohInt}(t)$$

It can now be shown that the synthetic aperture is efficiently and fully filled, as follows. Referring to the earlier equation for the velocity vector $V_f(t)$, the maximum velocity $V_{max}(t)$, in meters per second, is at the edge of the FOV at vector F(t), and is given by $$V_{max}(t) = (\omega_c(t) \times F(t)) + (\omega_p(t) \times F(t))$$

with the magnitude $v_{max}(t)$ of the velocity vector $V_{max}(t)$ being given by $$v_{max}(t) = \sqrt{\left(V_{max}(t) \cdot \frac{C(t)}{|C(t)|}\right)^2 + \left(V_{max}(t) \cdot \frac{P(t)}{|P(t)|}\right)^2}$$

and as shown graphically in FIG. 29.

The "count" deviation, $\Delta_{look}(t)$, which is also the "look" to "look" interval, is given by (in meters)

$$\Delta_{look}(t) = v_{max}(t) \cdot T_{ill}(t)$$

The overlaid "count" deviations are much closer after one sidereal day, after ten revisits for each of the three VLBI triads per zone plate, so that the hologram becomes fully filled. The overlaid zone plate grating intervals thus become woven together more closely, to an overlaid count deviation interval $\Delta_{coh}(t)$, such that, in meters, $$\Delta_{coh}(t) = \frac{\Delta_{look}(t)}{3 \cdot 10} = \frac{\Delta_{look}(t)}{30}$$

and as shown graphically in FIG. 30. From the graph shown in FIG. 30, using the selected "test case" wavelength value of 0.25 meters for this analysis, it is clear that the sampled grating interval at the edge of the synthetic aperture, which is the finest resolution point for this test case, is less than one wavelength. It shall now be understood that the hologram is "fully filled" but not very "over filled", which would be wasteful of energy. Accordingly, this analysis shows that the present invention is very efficient because the resulting hologram is only about 15% "over filled", at this small wavelength, for this test case.

This analysis shows that the hologram is "fully filled" (i.e., fully sampled). Furthermore, by the Uncertainty Principle of Physics, this analysis also shows that, unlike prior-art SAR technology and contrary to the parametric relations for all SAR, the resolution of the present invention's slowly-accumulating microwave holography improves as the bandwidth decreases. A similar result was also shown in the paper by Jack L. Walker, "Range-Doppler Imaging of Rotating Objects," IEEE Transactions on Aerospace and Electronic Systems, Vol. AES-16, No. 1, at pages 23–52 (January 1980).

The bandwidth and signal-to-noise ratio of the present invention will now be analyzed from a different perspective, namely, viewing the present invention as an interferometer.

Repeating the previous analysis using the Uncertainty Principle of Physics for electronic systems, because it takes one entire sidereal day for any one VLBI to complete its traverse to the point where the trace of that VLBI once again begins to repeat its swath in its resonant orbit, the response time $T_{CohInt}$ for the coherent interferometer is given, just as before, by (in seconds):

$$T_{CohInt} = 24 \cdot 60 \cdot 60 \cdot \frac{365.25}{366.25} = 8.616 \times 10^4$$

with the bandwidth $B_{CohInt}$ of the coherent interferometer, as before, then being given by (in Hz):

$$B_{CohInt} = \frac{\pi}{T_{CohInt}} = 3.646 \times 10^{-5}$$

This corresponds to the same bandwidth that will be computed based on the magnitude, $w_p(t)$, of the angular velocity, in radians per second, of the VLBI phase centerline, such that (in Hz)

$$B_p(t) = \frac{w_p(t)}{2\pi}$$

as shown graphically in FIG. 31.

The noise energy density, NoInt(t), in watt-seconds per square meter, for the present invention viewed as an interferometer, is then $$No_{Int} = kTB_p(t)$$

where, as before, k is the well-known Boltzmann's constant and T is the temperature, in degrees Kelvin, seen by the antenna. The energy density in the image plane, $E_{4Int}(t)$, is then $$E_{4Int}(t) = E_3(t) \cdot G_{SynAp}(t)$$

so that $$SNR_{Int}(t) = \frac{E_{4Int}(t)}{No_{Int}(t)}$$

as shown graphically in FIG. 32. It should be noted that this calculation for $SNR_{Int}(t)$ corresponds closely with the previous value that was calculated for $SNR_4(t)$ and as shown graphically in FIG. 46. One possible explanation for the fact that the value calculated for $SNR_4(t)$ is about half the value calculated for $SNR_{Int}(t)$ could be the arbitrary averaging of two resolution cells in our earlier analysis, caused by the doubling of the resolution $\zeta$ in the previous calculations for $E_2(t)$ and $E_3(t)$.

An analysis will now be provided of the use of partial Analog to Digital conversion of the hologram for digitization of "bright" objects, for computer calibration of the instrumentation, and for registration control of the optical image reconstruction. Although the present invention, as compared to the prior art, has uniquely advantageous attributes for optical image reconstruction, many users of the present invention may prefer to use digital image reconstruction. Accordingly, an analysis will now be made of the contrast ratio, CNR, in the Fourier plane at the end of the "burn in" time of the holographic fringes, after the completion of the "fully filled" coherence time cycle of the present invention. If the CNR is at least 3 db, then Analog to Digital ("A/D") conversion is practical at the Fourier plane for image reconstruction via well-known Fast Fourier Transform ("FFT") methods.

The (unitless) contrast ratio $CNR_{Fringe}(t)$ of the fringes of the holographic image is given by $$CNR_{Fringe}(t) = \frac{E_{Fringe}}{No_{Int}(t)}$$

and is shown graphically in FIG. 33, where $E_{Fringe}$, the total energy in the holographic fringes, is given by (in watt-seconds per square meter):

$$E_{Fringe} = \int_0^{T_{CohInt}} E_3(t) dt$$

This result shows targets whose normalized RCS is that for typical agricultural species, corresponding to our choice of a representative function for $\sigma_o(t)$, the normalized Radar Cross Section ("RCS") for an average rural scene such as farm land. These targets have a CNR that is generally too low to be detected, but scattered about the earth's surface are numerous bright objects whose "glint" will bring this CNR to a positive value, e.g., 3 db or more above the noise level. The glint improvement depends on the value of $\rho_s/\lambda$, which is a measure of the planar area, or RCS, as compared to the target specie, which here is $\sigma_o(t)$, representative of typical agricultural areas. For typical man-made objects, having moderate to large planar surfaces, the glint improvement can be estimated as follows for objects such as a car or a building, using $$\rho_{sCar} = \frac{4 \times 10^3}{\sigma_0(t_{mid})} \quad \text{and} \quad \rho_{sBuilding} = \frac{4 \times 10^5}{\sigma_0(t_{mid})}$$

such that $$CNR_{Car}(t) = CNR_{Fringe}(t) \cdot \rho_{sCar}$$

and $$CNR_{Building}(t) = CNR_{Fringe}(t) \cdot \rho_{s\ Building}$$

as shown graphically in FIG. 34. This analysis shows that the Fourier plane may be digitized, if desired, prior to image reconstruction so as to permit imaging of bright objects as small as a car or as large as a building. Additionally, data from digitization of the Fourier plane may be used for calibration and registration of the optical system of the present invention, for image reconstruction of many agricultural species. Enhancement of forward-scatter ("glint") probabilities by the method of the present invention, as compared to the prior art, is discussed in greater detail hereinbelow.

The fringe width of the interferometer will now be analyzed in accordance with Bragg's law. Referring to FIG. 38, $\phi_3(t)$, the bistatic angle for each VLBI at the FOV, is given by $$\phi_3(t) = \pi - \phi_1(t) - \phi_2(t)$$

and, by Bragg's Law, the fringe interval, $d_{Fringe}(t)$, of the VLBI at ground level of the FOV is given by (in meters):

$$d_{Fringe}(t) = \frac{\lambda}{\phi_3(t)}$$

or, as a fraction of wavelength, is given by $$d_{FringePer\lambda}(t) = \frac{1}{\phi_3(t)}$$

The ground resolution $VLBI_{Res}(t)$ of each VLBI is given by $$VLBI_{Res}(t) = \frac{h(t) \cdot \lambda}{c(t)}$$

or, as a fraction of wavelength, is given by $$VLBI_{ResPer\lambda}(t) = \frac{h(t)}{c(t)}$$

Both $d_{Fringe}(t)$ and $VLBI_{Res}(t)$ are shown graphically in FIG. 35. Because the VLBI resolution at the center of the image plane, i.e., evaluated when $t=t_{mid}$, is determined by the fringe interval at the edge of the Fourier plane, i.e., when $t=0$, note that the value of the fringe interval, as a fraction of wavelength, at the edge of the Fourier plane, $$d_{FringePer\lambda}(0) = \frac{1}{\phi_3(0)} = 0.4$$

matches the value of the ground resolution of each VLBI, as a fraction of wavelength, evaluated at the center of the image plane, $$VLBI_{ResPer\lambda}(t_{mid}) = \frac{h(t_{mid})}{c(t_{mid})} = 0.4$$

This shows that a matched filter, as depicted in FIG. 49 (a Fresnel lens) in the Fourier plane, is centered on each resolved pixel in the image plane. This collage of "Fresnel lenses" creates the composite hologram.

Comparing the fringe interval versus VLBI ground resolution, it can be seen that resolution also loosely depends on the bistatic angle $\phi_3(t)$, and thus on the magnitude of the ratio of c(t), the length of the VLBI vector, to $D_{FOV}$, the diameter of the field of view, i.e., $$\frac{c(t)}{D_{FOV}}$$

Accordingly, the conclusion is made that all short baseline interferometers will be aliased, i.e., indeterminate, for large FOV. The present invention, because of the extreme length of the VLBI vector, is uniquely able to illuminate and image a very large FOV, as compared with the prior art, while still producing an unaliased image. For the same reason, i.e., because $$\frac{c(t)}{D_{FOV}} \gg 1$$

the wavefront from the VLBI, arriving at the FOV, is convergent, so the spatial matched filter, i.e., the hologram, has a positive gain.

In contrast to the preceding conceptual analysis of the performance of the present invention as measured at the first power-aperture, which operates at microwave frequencies, it will be understood that the second power-aperture of the present invention operates at optical frequencies. Although the signal-to-noise ratio, the transmitter power $P_{Trans}$, and the ground resolution will not change in an analysis of the second power-aperture, the optical gain will not be the same as the microwave coherent gain, $G_{holo}$. Also, because the Noise Density is dominated by the 290° Kelvin temperature of the earth, the optical system of the second power-aperture will add only negligible noise density. Because the second power-aperture's optical "burn-in" time, $T_{Optical}$, and its average illumination power level, $P_{Optical}$, may be selected as a discretionary implementation detail of the present invention, in a manner well-known to those skilled in the art, unconstrained by $T_{ill}$, the illumination time, it follows that the signal-to-noise ratio of the second power-aperture, $SNR_{Optical}$, will be comparable or equal to the signal-to-noise ratio $SNR_{Microwave}$ at the output of the first power aperture, when the implementation of the second power-aperture's optical system is chosen such that, in watt-seconds (if only a single VLBI is used), $E_{Optical}$, the total energy of the optical "burn in", i.e., $P_{Optical}$ times $T_{Optical}$, satisfies the inequality $$E_{Optical} = P_{Optical} \cdot T_{Optical} \geq \frac{\int_{t_1}^{t_2} E_3(t)dt}{T_D} \cdot \left(\frac{F_{Optical}}{F_{Microwave}}\right)^2 \cdot A_D$$

where $F_{Microwave}$ and $F_{Optical}$ are the respective microwave and optical frequencies of the first and second power-apertures, $A_D$ is the image recording area, in square meters, of the holographic recording disc, and, from before, $T_D$ is the hologram sector "dwell time", and $E_3(t)$ is the energy density arriving at the holographic recording disc in the Fourier plane for the single VLBI case.

It shall be understood, however, that the above inequality is only correct when a single VLBI is considered because the above conceptual parametric analysis of the single-VLBI case computed $E_3(t)$ for a single VLBI only. It should be noted, however, that the preferred embodiment of the present invention has three VLBI per VLA, and that it takes one sidereal day to "fully fill" the holographic recording disc at the Fourier plane, and further that, for the preferred 5:1 resonant orbit case, there will be ten "passes" per sidereal day for each VLA, with each pass taking $T_D$ seconds. Additionally, as shown in FIG. 18 and as heretofore described in detail, preferably both of satellites A and B each have a transmitter and receiver, thereby forming a dual interferometer data stream for the field of view that is merged to create the holographic image in the Fourier plane. Accordingly, when the full preferred embodiment of the invention is deployed, an additional factor of 3*10*2, resulting from the three VLBI, the ten passes, and the two interferometer data streams per satellite pair A and B, must be multiplied times the energy arriving at the holographic recording disc in the Fourier plane for the single VLBI case, such that, for the full preferred embodiment, in order for the second power-aperture's signal-to-noise ratio, $SNR_{Optical}$, not to degrade the performance of the system, it is necessary that $$P_{Optical} \cdot T_{Optical} \geq 60 \cdot \frac{\int_{t_1}^{t_2} E_3(t)dt}{T_D} \cdot \left(\frac{F_{Optical}}{F_{Microwave}}\right)^2 \cdot A_D$$

It will be noted that one of the present invention's innovative features is the low power level needed in the optical "burn in" because of the large gain of the system and because of the accumulating fill of the holographic image over time while still preserving phase coherence, as heretofore described. A particular implementation of the present invention therefore has the flexibility to trade power versus optical "burn in" time to arrive at the minimum energy level needed, as given by the above equation, to produce a desired signal-to-nose ratio $SNR_4$.

Now that a conceptual parametric analysis has been presented for the present invention, and with the MIRIAH*2, MIRIAH*3, MIRIAH*6, and MIRIAH*12 configurations now being well understood, the VLBI configuration of MIRIAH*4 will be briefly discussed, together with a discussion of its advantages and disadvantages. It shall be understood that there are many similarities between all of the MIRIAH configurations, and only those differences specific to the MIRIAH*4 configuration will be discussed in detail, referring to FIG. 37.

As is the case with MIRIAH*2, a MIRIAH*4 configuration, such as VLA quad 108 of FIG. 37, does not have a satellite on the phase centerline of each (or any) of the four VLBI 130, 132, 134, 136, the MIRIAH*4 configuration does have the interesting property that the line of sight between adjacent VLBI, e.g., between VLBI 130 and 132, and between VLBI 132 and 134, and between VLBI 134 and 136, and between VLBI 136 and 130, is always at right angles, and the sum of the length for any two adjacent VLBI is always constant.

As shown in FIG. 37, each MIRIAH*4 configuration, having four VLBI, images four FOV, ie., FOV 138, 140, 142, 144, it being understood that FOV 144 is obscured, being on the back side of the earth E.

As previously shown and discussed in connection with FIG. 18, and as also now diagrammatically shown in FIG. 37, in the case of each VLBI, there are always two pairs of electromagnetic beams, namely, the reference beam and the information (or imaging beam), and these pairs of beams can be reversed at will, the reference beam becoming the information (or imaging) beam, and vice versa. Likewise, in the case of communication links (typically in the sidebands of the satellite-to-satellite links), full duplex operation can be achieved by transmitting and receiving in both directions simultaneously, thereby doubling the number of communication links. These links are comprised of Range, Doppler, and Communications links (in addition to interferometer communication), and, by the geometry of the MIRIAH*4 configuration, opposite vertices of the VLA quads are always 180° apart. Accordingly, the Range sum between hemispheres remains constant, and the transit time from one hemisphere to the other is also constant. Therefore, if parallel coding is used for data transmission, the size of the memory buffer required at either of the terminals will be nominally zero, thereby reducing the complexity of the hardware, and also reducing the delay time required to synchronize the parallel-coded communications streams. This efficiency and capacity, and the communication security provided by parallel coding, are all further enhanced by the point-to-point communications links of the MIRIAH architecture.

Another disadvantage of the MIRIAH*4 architecture, as compared with, for example, the MIRIAH*3 architecture, is that the rectangular plane of MIRIAH*4 is not inertially fixed in space parallel to an isometric plane, whereas the VLA of MIRIAH*3 is inertially fixed in space parallel to an isometric plane. However, MIRIAH*4 has an additional degree of statistical freedom, which can be a compensating advantage when solving the appropriate phase closure equations when those equations are adapted to the MIRIAH*4 case. Compare the prior phase closure equation discussion in connection with FIG. 4.

Although the present invention has been described and illustrated with respect to a preferred embodiment and a preferred use therefor, it is not to be so limited since modifications and changes can be made therein which are within the full intended scope of the invention.

I claim:

1. A satellite interferometer architecture, said satellite architecture comprising a first and a second satellite orbiting respectively in first and second nominally circular orbits; both of said satellites having substantially equal orbital angular velocities; said first and said second satellites forming a first VLA in which said first and said second satellites form a first VLBI pair of said VLA; each said VLBI pair comprising:

(a) first transmitter means on one of the satellites of said VLBI pair for illuminating a FOV on an orbited planet with a first transmitted signal so that said first transmitted signal is reflected from the FOV after interfering with a second transmitted signal;

(b) second transmitter means on the other of the satellites of said VLBI pair for illuminating the FOV on the orbited planet with said second transmitted signal so that said second transmitted signal is reflected from the FOV after interfering with said first transmitted signal;

(c) first receiver means on said other of the satellites of said VLBI pair for receiving the reflected first transmitted signal and for producing first receiver imagery data; and (d) second receiver means on said one of the satellites of said VLBI pair for receiving the reflected second transmitted signal and for producing second receiver imagery data;

said satellite interferometer architecture further comprising holographic recording means for recording Fizeau interferometric fringes, said Fizeau fringes being formed from imagery data from at least one of said first and said second receivers.

2. The satellite architecture as recited in claim 1, in which said first and second orbits are respectively within first and second substantially orbital planes, said first and said second orbital planes being substantially mutually orthogonal.

3. A satellite interferometer architecture, said satellite architecture comprising a first, a second, and a third satellite orbiting respectively in first, second, and third nominally circular orbits respectively within first, second, and third substantially orbital planes; said first, said second, and said third orbital planes being substantially mutually orthogonal; all of said satellites having substantially equal orbital angular velocities; said first, said second, and said third satellites forming a first VLA, said first VLA comprising a first VLBI pair formed by said first and said second satellites; said third satellite being a first VLBI pair control; each said VLBI pair comprising:

(a) first transmitter means on one of the satellites of said VLBI pair for illuminating a FOV of said VLBI pair on an orbited planet with a first transmitted signal so that said first transmitted signal is reflected from the FOV after interfering with a second transmitted signal;

(b) second transmitter means on the other of the satellites of said VLBI pair for illuminating the FOV on the orbited planet with said second transmitted signal so that said second transmitted signal is reflected from the FOV after interfering with said first transmitted signal;

(c) first receiver means on said other of the satellites of said VLBI pair for receiving the reflected first transmitted signal and for producing first receiver imagery data;

(d) second receiver means on said one of the satellites of said VLBI pair for receiving the reflected second transmitted signal and for producing second receiver imagery data, each said VLBI pair control being substantially equidistant from both of the satellites of its respective VLBI pair, and each said VLBI pair control comprising holographic recording means for recording Fizeau interferometric fringes, said Fizeau fringes being formed from imagery data from at least one of said first and said second receivers of said both satellites of said VLBI pair control's respective VLBI pair.

4. An improved method of satellite imaging, said method comprising the steps of:

(a) providing the satellite architecture as recited in claim 3; and then (b) superimposing said recorded Fizeau interferometric fringes for more than one orbit of said satellites.

5. The satellite architecture as recited in claim 3, in which said first VLA further comprises:

(a) a second VLBI pair formed by said second and said third satellites, said first satellite being a second VLBI pair control; and (b) a third VLBI pair formed by said third and said first satellites, said second satellite being a third VLBI pair control.

6. An improved method of satellite imaging, said method comprising the steps of:

(a) providing the satellite architecture as recited in claim 5; and then (b) superimposing said recorded Fizeau interferometric fringes for a sidereal day.

7. A satellite interferometer architecture, said satellite architecture comprising:

(a) a first and a second satellite orbiting in a first nominally circular orbit within a first substantially orbital plane;

(b) a third and a fourth satellite orbiting in a second nominally circular orbit within a second substantially orbital plane;

(c) a fifth and a sixth satellite orbiting in a third nominally circular orbit within a third substantially orbital plane;

said first, said second, and said third orbital planes being substantially mutually orthogonal; all of said satellites having substantially equal orbital angular velocities; and both satellites within each said orbital plane being separated from each other by substantially 180° of central angle;

said first, said third, and said fifth satellites forming a first VLA;

said second, said fourth, and said sixth satellites forming a second VLA;

said first, said third, and said sixth satellites forming a third VLA;

said second, said fourth, and said fifth satellites forming a fourth VLA;

said first, said fourth, and said sixth satellites forming a fifth VLA;

said second, said third, and said fifth satellites forming a sixth VLA;

said first, said fourth, and said fifth satellites forming a seventh VLA;

said second, said third, and said sixth satellites forming an eighth VLA;

each said VLA comprising a first, a second, and a third VLBI pair formed by pairwise selecting two satellites from said each VLA; each said VLBI pair further having a respective VLBI pair control chosen as the remaining satellite from its VLA that is not a VLBI pair satellite for that respective pairwise selection;

each said VLBI pair comprising:

(a) first transmitter means on one of the satellites of said VLBI pair for illuminating a FOV of said VLBI pair on an orbited planet with a first transmitted signal so that said first transmitted signal is reflected from the FOV after interfering with a second transmitted signal;

(b) second transmitter means on the other of the satellites of said VLBI pair for illuminating the FOV on the orbited planet with said second transmitted signal so that said second transmitted signal is reflected from the FOV after interfering with said first transmitted signal;

(c) first receiver means on said other of the satellites of said VLBI pair for receiving the reflected first transmitted signal and for producing first receiver imagery data;

(d) second receiver means on said one of the satellites of said VLBI pair for receiving the reflected second transmitted signal and for producing second receiver imagery data;

each said VLBI pair control being substantially equidistant from both of the satellites of its respective VLBI pair, and each said VLBI pair control comprising holographic recording means for recording Fizeau interferometric fringes, said Fizeau fringes being formed from imagery data from at least one of said first and said second receivers of said both satellites of said VLBI pair control's respective VLBI pair.

8. An improved method of;satellite imaging, said method comprising the steps of:

(a) providing the satellite architecture as recited in claim 7; and then (b) superimposing said recorded Fizeau interferometric fringes for one half of a sidereal day.

9. A satellite interferometer architecture, said satellite architecture comprising:

(a) a first, a second, a third, and a fourth satellite all orbiting in a first nominally circular orbit within a first substantially orbital plane; said first and said second satellites being a first orbital pair and said third and said fourth satellites being a second orbital pair;

(b) a fifth, a sixth, a seventh, and an eighth satellite all orbiting in a second nominally circular orbit within a second substantially orbital plane; said fifth and said sixth satellites being a third orbital pair and said seventh and said eighth satellites being a fourth orbital pair;

(c) a ninth, a tenth, an eleventh, and a twelfth satellite all orbiting in a third nominally circular orbit within a third substantially orbital plane; said ninth and said tenth satellites being a fifth orbital pair and said eleventh and said twelfth satellites being a sixth orbital pair;

all of said satellites having substantially equal orbital angular velocities; the satellites within each orbital pair being separated from each other by substantially 180° of central angle; and the two orbital pairs of each said orbital plane having an opposite sense of orbital rotation;

said first, said fifth, and said ninth satellites forming a first VLA;

said second, said sixth, and said tenth satellites forming a second VLA;

said first, said fifth, and said tenth satellites forming a third VLA;

said second, said sixth, and said ninth satellites forming a fourth VLA;

said first, said sixth, and said tenth satellites forming a fifth VLA;

said second, said fifth, and said ninth satellites forming a sixth VLA;

said first, said sixth, and said ninth satellites forming a seventh VLA;

said second, said fifth, and said tenth satellites forming an eighth VLA;

said third, said seventh, and said eleventh satellites forming a ninth VLA;

said fourth, said eighth, and said twelfth satellites forming a tenth VLA;

said third, said seventh, and :said twelfth satellites forming an eleventh VLA;

said fourth, said eighth, and said eleventh satellites forming a twelfth VLA;

said third, said eighth, and said twelfth satellites forming a thirteenth VLA;

said fourth, said seventh, and said eleventh satellites forming a fourteenth VLA;

said third, said eighth, and said eleventh satellites forming a fifteenth VLA;

said fourth, said seventh, and said twelfth satellites forming a sixteenth VLA;

each said VLA comprising a first, a second, and a third VLBI pair formed by pairwise selecting two satellites from said each VLA; each said VLBI pair further having a respective VLBI pair control chosen as the remaining satellite from its VLA that is not a VLBI pair satellite for that respective pairwise selection;

each said VLBI pair comprising:

(a) first transmitter means on one of the satellites of said VLBI pair for illuminating a FOV of said VLBI pair on an orbited planet with a first transmitted signal so that said first transmitted signal is reflected from the FOV after interfering with a second transmitted signal;

(b) second transmitter means on the other of the satellites of said VLBI pair for illuminating the FOV on the orbited planet with said second transmitted signal so that said second transmitted signal is reflected from the FOV after interfering with said first transmitted signal;

(c) first receiver means on said other of the satellites of said VLBI pair for receiving the reflected first transmitted signal and for producing first receiver imagery data;

(d) second receiver means on said one of the satellites of said VLBI pair for receiving the reflected second transmitted signal and for producing second receiver imagery data;

each said VLBI pair control being substantially equidistant from both of the satellites of its respective VLBI pair, and each said VLBI pair control comprising holographic recording means for recording Fizeau interferometric fringes, said Fizeau fringes being formed from imagery data from at least one of said first and said second receivers of said both satellites of said VLBI pair control's respective VLBI pair.

10. An improved method of satellite imaging, said method comprising the steps of:

(a) providing the satellite architecture as recited in claim 9; and then (b) superimposing said recorded Fizeau interferometric fringes for one quarter of a sidereal day.

11. A satellite interferometer architecture, said satellite architecture comprising:

(a) a first and a second satellite orbiting in a first nominally circular orbit within a first substantially orbital plane;

(b) a third and a fourth satellite orbiting in a second nominally circular orbit within a second substantially orbital plane;

said first and said second orbital planes being substantially mutually orthogonal; all of said satellites having substantially equal angular velocities; and both satellites within each said orbital plane being separated from each other by substantially 180° of central angle;

said first, said second, said third, and said fourth satellites forming a first VLA;

each said VLA comprising a first, a second, a third, and a fourth VLBI pair formed by pairwise selecting one satellite from each said orbital plane;

each said VLBI pair comprising:
- (a) first transmitter means on one of the satellites of said VLBI pair for illuminating a FOV of said VLBI pair on an orbited planet with a first transmitted signal so that said first transmitted signal is reflected from the FOV after interfering with a second transmitted signal;
- (b) second transmitter means on the other of the satellites of said VLBI pair for illuminating the FOV on the orbited planet with said second transmitted signal so that said second transmitted signal is reflected from the FOV after interfering with said first transmitted signal;
- (c) first receiver means on said other of the satellites of said VLBI pair for receiving the reflected first transmitted signal and for producing first receiver imagery data;
- (d) second receiver means on said one of the satellites of said VLBI pair for receiving the reflected second transmitted signal and for producing second receiver imagery data;

each said VLA further comprising holographic recording means for recording Fizeau interferometric fringes, said Fizeau fringes being formed from imagery data from at least one of said first and said second receivers of said both satellites of said VLBI pair control's respective VLBI pair.

12. An improved method of satellite imaging, said method comprising the steps of:
- (a) providing the satellite architecture as recited in claim 11; and then
- (b) superimposing said recorded Fizeau interferometric fringes for more than one orbit of said satellites.

* * * * *